US012641542B2

(12) United States Patent
He

(10) Patent No.: US 12,641,542 B2
(45) Date of Patent: May 26, 2026

(54) METHOD FOR WIRELESS COMMUNICATION AND FIRST DEVICE

(71) Applicant: GUANGDONG OPPO MOBILE TELECOMMUNICATIONS CORP., LTD., Dongguan (CN)

(72) Inventor: Chuanfeng He, Dongguan (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 331 days.

(21) Appl. No.: 18/454,060

(22) Filed: Aug. 22, 2023

(65) Prior Publication Data

US 2023/0397118 A1     Dec. 7, 2023

Related U.S. Application Data

(63) Continuation of application No. PCT/CN2021/080274, filed on Mar. 11, 2021.

(51) Int. Cl.
H04W 52/02        (2009.01)
H04L 5/00         (2006.01)

(52) U.S. Cl.
CPC ....... H04W 52/0235 (2013.01); H04L 5/0048 (2013.01)

(58) Field of Classification Search
CPC ......... H04W 52/0209; H04W 52/0216; H04W 52/0219; H04W 52/0225; H04W 52/0229; H04W 52/0235; H04W 68/02; H04W 68/025; H04L 5/0048; H04L 5/0053
See application file for complete search history.

(56) References Cited

U.S. PATENT DOCUMENTS

2022/0225237 A1*   7/2022   He ................... H04W 72/0446
2023/0362889 A1*  11/2023   Xu ................... H04W 52/0219
2023/0422211 A1*  12/2023   Esswie ............... H04W 72/232
2024/0039669 A1*   2/2024   Koskela .............. H04L 5/0051
                   (Continued)

FOREIGN PATENT DOCUMENTS

CN        109286966        1/2019
CN        112425211        2/2021
                   (Continued)

OTHER PUBLICATIONS

OPPO, "Potential paging enhancements", Jan. 25-Feb. 5, 2021, 3GPP TSG RAN WG1 #104-e, R1-2100168, pp. 1-4 (Year: 2021).*
                   (Continued)

*Primary Examiner* — Paul H. Masur
(74) *Attorney, Agent, or Firm* — Hodgson Russ LLP

(57)        ABSTRACT

A method for wireless communication are provided. The method includes the following. A first device determines a target reference signal (RS) transmission occasion set according to whether a power-saving signal is detected or transmitted on a target resource set, and/or, according to content indicated by the power-saving signal. The power-saving signal indicates whether a terminal device is to monitor in a target paging occasion (PO) a physical downlink control channel (PDCCH) carrying paging indication information, and the target RS transmission occasion set contains RS transmission occasions for transmitting an RS.

20 Claims, 9 Drawing Sheets

(56) References Cited

U.S. PATENT DOCUMENTS

| | | | | |
|---|---|---|---|---|
| 2024/0064048 A1* | 2/2024 | Ye | ........................ | H04W 68/005 |
| 2024/0089921 A1* | 3/2024 | Ma | ........................ | H04L 5/0053 |

FOREIGN PATENT DOCUMENTS

| | | | | |
|---|---|---|---|---|
| CN | 112449745 | 3/2021 | | |
| WO | WO-2022031540 A1 * | 2/2022 | ........ | H04W 52/0277 |

OTHER PUBLICATIONS

Huawei et al., "Paging enhancement(s) for UE power saving in Idle/inactive mode", Jan. 25-Feb. 5, 2021, 3GPP TSG RAN WG1 Meeting #104-e, R1-2100216, pp. 1-17 (Year: 2021).*

CATT, "Paging enhancement for UE power saving", Jan. 25-Feb. 5, 2021, 3GPP TSG RAN WG1 #104-e, R1-2100392, pp. 1-17 (Year: 2021).*

CATT, "Configuration of TRS/CSI-RS for paging enhancement", Jan. 25-Feb. 5, 2021, 3GPP TSG RAN WG1 #104-e, R1-2100393, pp. 1-8 (Year: 2021).*

Vivo, "Paging enhancements for idle/inactive mode UE power saving", Jan. 25-Feb. 5, 2021, 3GPP TSG RAN WG1 #104-e, R1-2100452, pp. 1-16 (Year: 2021).*

MediaTek, "Design of paging early indication for idle/inactive-mode UE power saving", Jan. 25-Feb. 5, 2021, 3GPP TSG RAN WG1 #104-e, R1-2100591, pp. 1-9 (Year: 2021).*

Lenovo et al., "Paging enhancement for UE power saving", Jan. 25-Feb. 5, 2021, 3GPP TSG RAN WG1 Meeting #104-e, R1-2100998, pp. 1-5 (Year: 2021).*

CMCC, "Discussion on paging early indication design", Jan. 25-Feb. 5, 2021, 3GPP TSG RAN WG1 #104-e, R1-2101052, pp. 1-4 (Year: 2021).*

Xiaomi, "Paging enhancements for power saving", Jan. 25-Feb. 5, 2021, 3GPP TSG RAN WG1 #104, R1-2101125, pp. 1-4 (Year: 2021).*

Qualcomm, "Paging enhancements for idle/inactive mode UE power saving", Jan. 25-Feb. 5, 2021, 3GPP TSG-RAN WG1 #104-e, R1-2101474, pp. 1-8 (Year: 2021).*

Nokia, "Evaluation of potential paging enhancements", Jan. 25-Feb. 5, 2021, 3GPP TSG RAN WG1 #104e, R1-2101664, pp. 1-12 (Year: 2021).*

MediaTek, "Summary for Paging Enhancements", Jan. 25-Feb. 5, 2021, 3GPP TSG RAN WG1 e-Meeting #104, R1-2101948, pp. 1-36 (Year: 2021).*

"3rd Generation Partnership Project; Technical Specification Group Radio Access Network; NR; User Equipment (UE) procedures in Idle mode and RRC Inactive state (Release 16)," 3GPP TS 38.304, Mar. 2020, v16.0.0.

"3rd Generation Partnership Project; Technical Specification Group Radio Access Network; NR; Physical layer procedures for control (Release 16)," 3GPP TS 38.213, Jun. 2020, v16.2.0.

"3rd Generation Partnership Project; Technical Specification Group Radio Access Network; NR; Radio Resource Control (RRC) protocol specification (Release 16)," 3GPP TS 38.331, Jul. 2020, v16.1.0.

Panasonic, "Potential Enhancements for TRS/CSI-RS Occasion(s) for Idle/Inactive UEs," 3GPP TSG RAN WG1 Meeting#104-e, R1-2101301, Jan. 2021.

OPPO, "Further Discussion on RS Occasion for Idle/Inactive UEs," 3GPP TSG RAN WG1 #104-e, R1-2100169, Jan. 2021.

CMCC, "Discussion on TRS/CSI-RS Occasion(s) for Idle/Inactive-mode UEs," 3GPP TSG RAN WG1 #104-e, 1-2101053, Jan. 2021.

WIPO, International Search Report and Written Opinion for International Application No. PCT/CN2021/080274, Nov. 15, 2021.

Mediatek Inc., "Summary for Paging Enhancements," 3GPP TSG RAN WG1 e-Meeting #104, R1-2101948, Jan. 2021.

Mediatek Inc., "Evaluation methodology and paging enhancements for idle/inactive mode UE power saving," 3GPP TSG RAN WG1 #102-e, R1-2005615, Aug. 2020.

EPO, Extended European Search Report for EP Application No. 21929583.9, Mar. 11, 2024.

* cited by examiner

100

POWER-SAVING-SIGNAL MONITORING POSITION

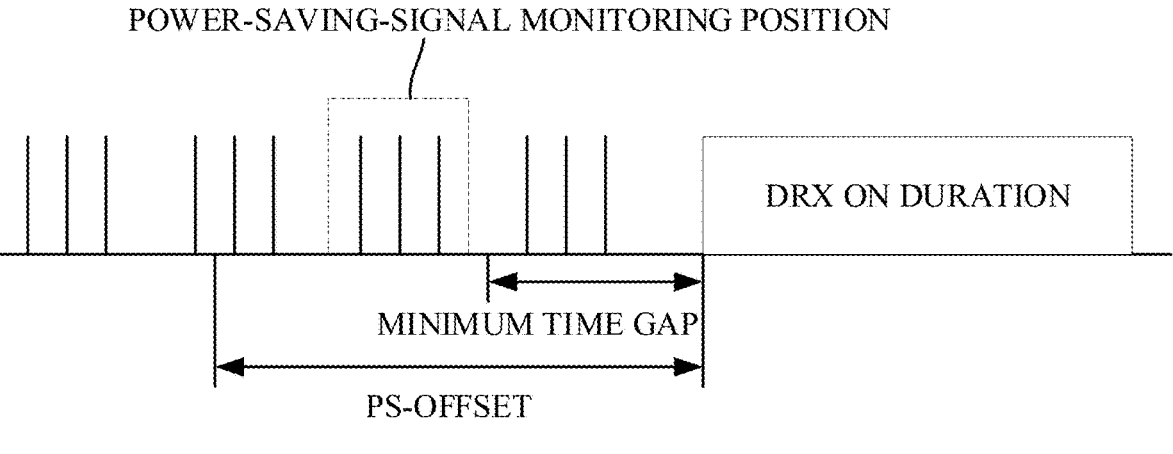

DRX ON DURATION

MINIMUM TIME GAP

PS-OFFSET

DETERMINE, BY A FIRST DEVICE, A TARGET RS
TRANSMISSION OCCASION SET ACCORDING TO WHETHER A
POWER-SAVING SIGNAL IS DETECTED OR TRANSMITTED ON
A TARGET RESOURCE SET, AND/OR CONTENT INDICATED BY
THE POWER-SAVING SIGNAL, WHERE THE POWER-SAVING
SIGNAL INDICATES WHETHER A TERMINAL DEVICE IS TO
MONITOR IN A TARGET PO A PDCCH CARRYING PAGING
INDICATION INFORMATION, AND THE TARGET RS
TRANSMISSION OCCASION SET CONTAINS RS TRANSMISSION
OCCASIONS FOR TRANSMITTING AN RS

DETERMINE, BY A FIRST DEVICE, A TARGET RS TRANSMISSION OCCASION SET, WHERE RS TRANSMISSION OCCASIONS IN THE TARGET RS TRANSMISSION OCCASION SET ARE IN A FIRST CORRESPONDENCE WITH PDCCH MONITORING OCCASIONS IN A PDCCH MONITORING OCCASION SET IN A TARGET PO, THE RS TRANSMISSION OCCASIONS IN THE TARGET RS TRANSMISSION OCCASION SET ARE IN A SECOND CORRESPONDENCE WITH SSBS IN AN SSB SET, THE RS TRANSMISSION OCCASIONS IN THE TARGET RS TRANSMISSION OCCASION SET ARE IN A THIRD CORRESPONDENCE WITH POWER-SAVING-SIGNAL MONITORING OCCASIONS IN A POWER-SAVING-SIGNAL MONITORING OCCASION SET CORRESPONDING TO THE TARGET PO, OR RS RESOURCES IN AN RS RESOURCE SET ARE IN A FOURTH CORRESPONDENCE WITH THE SSBS IN THE SSB SET, WHERE EACH RS TRANSMISSION OCCASION IN THE TARGET RS TRANSMISSION OCCASION SET CORRESPONDS TO ONE RS RESOURCE IN THE RS RESOURCE SET

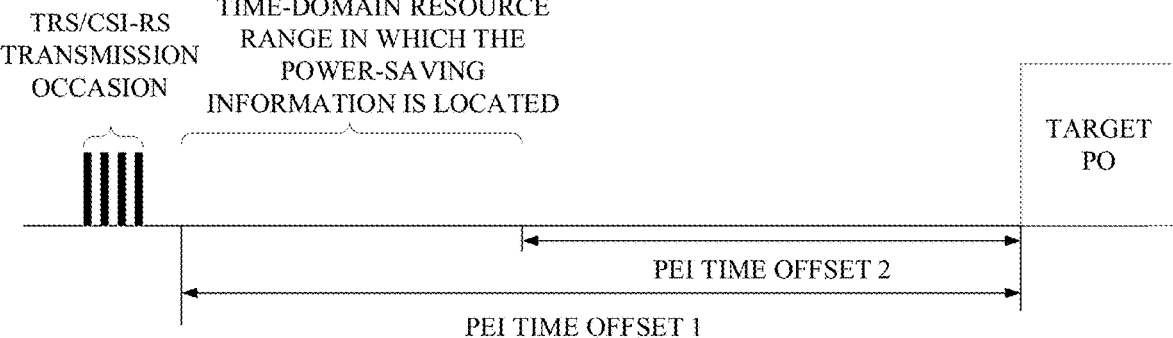

FIG. 13

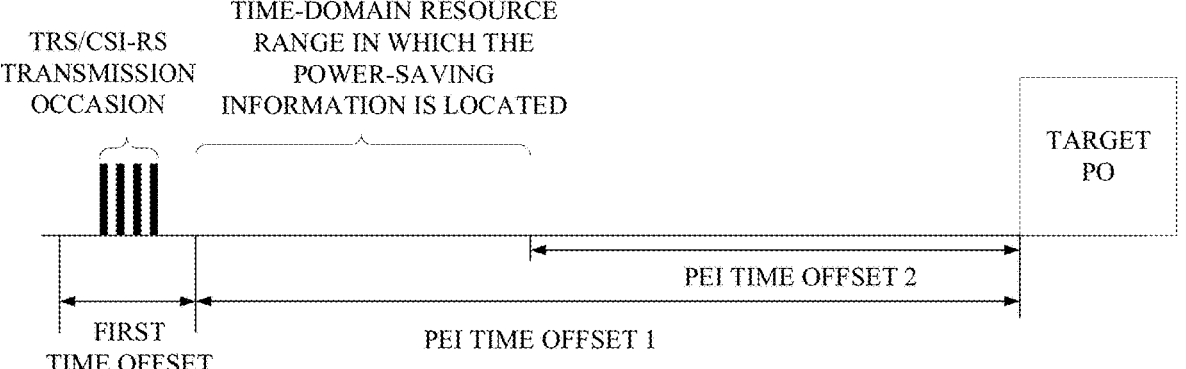
FIG. 14
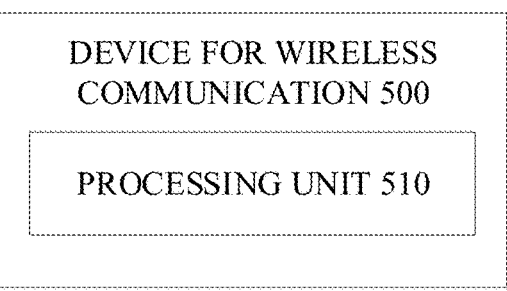
FIG. 15
FIG. 16

METHOD FOR WIRELESS COMMUNICATION AND FIRST DEVICE

CROSS-REFERENCE TO RELATED APPLICATION(S)

This application is a continuation of International Application No. PCT/CN2021/080274, filed Mar. 11, 2021, the entire disclosure of which is incorporated herein by reference.

TECHNICAL FIELD

This disclosure relates to the field of communication, and in particular, to a method for wireless communication and a first device.

BACKGROUND

For terminal devices in radio resource control (RRC) idle/inactive states, in order to save power, the terminal device does not need to perform detection in all channel state information-reference signal (CSI-RS)/tracking reference signal (TRS) transmission occasions. How to determine CSI-RS/TRS transmission occasions in which detection needs to be performed is a problem to-be-solved.

SUMMARY

A method for wireless communication and a first device are provided in implementations of the disclosure.

In a first aspect, a method for wireless communication is provided. The method includes the following. A first device determines a target reference signal (RS) transmission occasion set according to whether a power-saving signal is detected or transmitted on a target resource set, and/or, according to content indicated by the power-saving signal. The power-saving signal indicates whether a terminal device is to monitor in a target paging occasion (PO) a physical downlink control channel (PDCCH) carrying paging indication information, and the target RS transmission occasion set contains RS transmission occasions for transmitting an RS.

In a second aspect, a first device is provided. The first device includes a transceiver, a processor coupled to the transceiver, and a memory storing a computer program. The processor is configured to execute the computer program to cause the first device to perform the following. The first device determines a target reference signal (RS) transmission occasion set according to whether a power-saving signal is detected or transmitted on a target resource set, and/or, according to content indicated by the power-saving signal. The power-saving signal indicates whether a terminal device is to monitor in a target paging occasion (PO) a physical downlink control channel (PDCCH) carrying paging indication information, and the target RS transmission occasion set contains RS transmission occasions for transmitting an RS.

BRIEF DESCRIPTION OF THE DRAWINGS

FIG. 4 is a schematic diagram illustrating monitoring of a power-saving signal provided in the disclosure.

FIG. 5 is a schematic flow chart illustrating a method for wireless communication according to implementations of the disclosure.

FIG. 12 is another schematic flow chart illustrating a method for wireless communication according to implementations of the disclosure.

FIG. 13 is a schematic diagram of a TRS/CSI-RS transmission occasion according to implementations of the disclosure.

FIG. 14 is another schematic diagram of a TRS/CSI-RS transmission occasion according to implementations of the disclosure.

FIG. 15 is a schematic block diagram of a device for wireless communication according to implementations of the disclosure.

FIG. 16 is another schematic block diagram of a device for wireless communication according to implementations of the disclosure.

DETAILED DESCRIPTION

Figure 1:
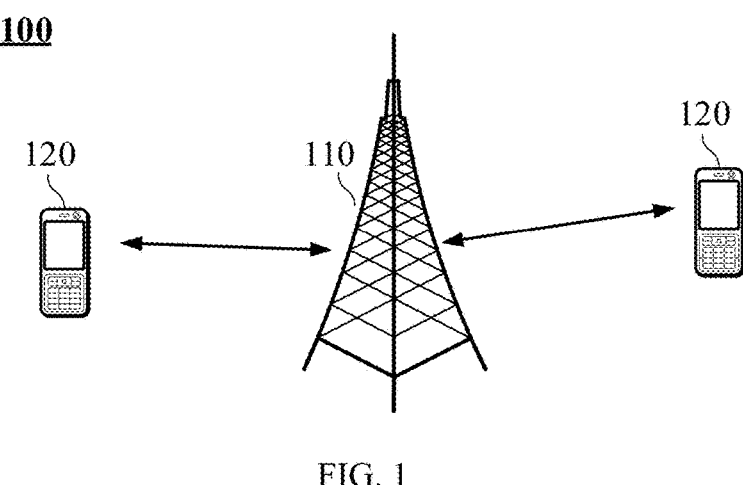
FIG. 1 is a schematic diagram illustrating a communication system architecture applicable to implementations of the disclosure.

The following will illustrate technical solutions of implementations of the disclosure with reference to accompanying drawings of implementations of the disclosure. Apparently, implementations described herein are some, rather than all, of the disclosure. Based on the implementations of the disclosure, all other implementations obtained by those of ordinary skill in the art without creative effort shall fall within the protection scope of the disclosure.

The technical solutions in implementations of the disclosure can be applicable to various communication systems, for example, a global system of mobile communication (GSM), a code division multiple access (CDMA) system, a wideband code division multiple access (WCDMA) system, a general packet radio service (GPRS) system, a long term evolution (LTE) system, an advanced LTE (LTE-A) system, a new radio (NR) system, an evolved system of the NR system, an LTE-based access to unlicensed spectrum (LTE-U) system, an NR-based access to unlicensed spectrum (NR-U) system, a non-terrestrial network (NTN) system, a universal mobile telecommunication system (UMTS), a wireless local area network (WLAN), a wireless fidelity (Wi-Fi), a $5^{th}$-generation (5G) system, or other communication systems.

Generally speaking, a conventional communication system supports a limited number of connections and therefore is easy to implement. However, with development of communication technology, a mobile communication system not only supports conventional communication but also supports, for example, device to device (D2D) communication, machine to machine (M2M) communication, machine type communication (MTC), and vehicle to vehicle (V2V) communication. Implementations herein can also be applicable to these communication systems.

In some implementations, a communication system in implementations of the disclosure can be applicable to a carrier aggregation (CA) scenario, a dual connectivity (DC) scenario, and a standalone (SA) scenario.

In some implementations, the communication system in implementations of the disclosure can be applicable to an unlicensed spectrum, where the unlicensed spectrum can also be regarded as a shared spectrum. Alternatively, the communication system in implementations of the disclosure can also be applicable to a licensed spectrum, where the licensed spectrum can also be regarded as an unshared spectrum.

In implementations of the disclosure, each implementation is illustrated in conjunction with a network device and a terminal device, where the terminal device may also be called a user equipment (UE), an access terminal, a subscriber unit, a subscriber station, a mobile station, a mobile platform, a remote station, a remote terminal, a mobile device, a user terminal, a terminal, a wireless communication device, a user agent, a user apparatus, etc.

The terminal device may also be a station (ST) in the WLAN, a cellular radio telephone, a cordless telephone, a session initiation protocol (SIP) telephone, a wireless local loop (WLL) station, a personal digital assistant (PDA). The terminal device may also be a device with wireless communication functions such as a handheld device, a computing device, other processing devices coupled with a wireless modem, an in-vehicle device, a wearable device, or a terminal device in a next-generation communication system such as an NR network, a terminal device in a future evolved public land mobile network (PLMN), etc.

In implementations of the disclosure, the terminal device can be deployed on land, including indoor or outdoor, handheld, wearable, or vehicle-mounted; on water (e.g., a ship); and also in the air (e.g., an aircraft, a balloon, and a satellite).

In implementations of the disclosure, the terminal device may be a mobile phone, a pad, a computer with wireless transceiving functions, a terminal device for virtual reality (VR), a terminal device for augmented reality (AR), a wireless terminal device in industrial control, a wireless terminal device in self driving, a wireless terminal device in remote medical, a wireless terminal device in smart grid, a wireless terminal device in transportation safety, a wireless terminal device in smart city, a wireless terminal device in smart home, etc.

As an example but not limitation, in implementations of the disclosure, the terminal device may also be a wearable device. The wearable device can also be called a wearable smart device, which is a collective name of wearable devices intelligently designed and developed by applying a wearable technology to daily wear, such as glasses, gloves, watches, clothing, shoes, etc. The wearable device is a portable device that can be worn directly on the body or integrated into clothing or accessories of a user. The wearable device not only is a hardware device but also can realize powerful functions through software support, data interaction, and cloud interaction. Broadly speaking, the wearable smart device includes a device that has full functions and a large size and can realize all or part of functions without relying on a smart phone, e.g., a smart watch, smart glasses, or the like, and includes a device that only focuses on a certain application function and needs to be used with other devices such as a smart phone, e.g., all kinds of smart bracelets and smart jewelry for physical sign monitoring or the like.

In implementations of the disclosure, the network device may be a device that is used to communicate with a mobile device. The network device may be an access point (AP) in the WLAN, a base transceiver station (BTS) in the GSM or CDMA system, a NodeB (NB) in the WCDMA system, or an evolved NodeB (eNB or eNodeB) in the LTE system. Alternatively, the network device may also be a relay station, an AP, an in-vehicle device, a wearable device, a network device or a generation NodeB (gNB) in the NR network, a network device in the future evolved PLMN, or a network device in the NTN network.

As an example but not limitation, in implementations of the disclosure, the network device can have a mobility, e.g., the network device may be a mobile device. In some implementations, the network device may be a satellite or a balloon station. For example, the satellite may be a low earth orbit (LEO) satellite, a medium earth orbit (MEO) satellite, a geostationary earth orbit (GEO) satellite, a high elliptical orbit (HEO) satellite, or the like. In some implementations, the network device may also be a base station deployed on land, on water, or on other locations.

In implementations of the disclosure, the network device can provide a service for a cell, and the terminal device can communicate with the network device through transmission resources (e.g., frequency-domain resources or spectrum resources) for the cell, where the cell may be a cell corresponding to the network device (e.g., a base station). The cell may belong to a macro base station or a base station corresponding to a small cell, where the small cell may include a metro cell, a micro cell, a pico cell, a femto cell, or the like. These small cells have features of small coverage ranges and low transmission power and are suitable for providing high-speed data transmission services.

Exemplarily, a communication system 100 applied in implementations of the disclosure is illustrated in FIG. 1. The communication system 100 may include a network device 110, where the network device 110 can communicate with a terminal device 120 (or called a communication terminal or a terminal). The network device 110 can provide communication coverage for a specific geographical area and can communicate with terminal devices in the coverage range.

FIG. 1 exemplarily illustrates a network device and two terminal devices. In some implementations, the communication system 100 may include multiple network devices, and the other number of terminal devices may be included in a coverage range of each of the multiple network devices, which will not be limited in implementations of the disclosure.

In some implementations, the communication system 100 may further include a network controller, a mobility management entity (MME), or other network entities, which will not be limited in implementations of the disclosure.

It can be understood that, a device with a communication function in a network/system in implementations of the disclosure can be called a communication device. Taking the communication system 100 illustrated in FIG. 1 as an example, communication devices may include the network device 110 and the terminal device 120 that have communication functions, and the network device 110 and the terminal device 120 may be the above-mentioned devices, which will not be repeated herein. The communication devices may further include other devices in the communication system 100, e.g., a network controller, an MME, or other network entities, which will not be limited in implementations of the disclosure.

It can be understood that, the terms "system" and "network" in this disclosure are often used interchangeably. The term "and/or" in this disclosure is simply an illustration of an association relationship of associated objects, indicating that three relationships may exist, for example, A and/or B, which may indicate the existence of A alone, A and B together, and B alone. In addition, the character "/" in this disclosure generally indicates that associated objects are in an "or" relationship.

The terms used in implementations of the disclosure are only for the purpose of explaining specific implementations of the disclosure rather than limiting the disclosure. The terms "first", "second", "third", "fourth", and the like used in the specification, the claims, and the accompany drawings of the disclosure are used to distinguish different objects rather than describe a particular order. In addition, the terms "include", "comprise", and "have" as well as variations thereof are intended to cover non-exclusive inclusion.

It can be understood that, the "indication" referred to in implementations of the disclosure may be a direct indication, an indirect indication, or an indication indicating an associated relation. For example, A indicates B, which can mean that A indicates B directly, e.g., B can be obtained through A, can also mean that A indicates B indirectly, e.g., A indicates C, and B can be obtained through C, or can further mean that A and B have an associated relation.

In illustration of implementations of the disclosure, the term "correspondence" may represent a direct correspondence or indirect correspondence between the two, may also represent an associated relation between the two, or may further represent a relation of indicating and being indicated, a relation of configuring and being configured, or other relations.

In implementations of the disclosure, "predefinition" may be implemented by pre-storing corresponding codes, tables, or other modes indicating relevant information in a device (for example, including a terminal device and a network device), and specific implementations are not limited in the disclosure. For example, predefinition may refer to definition in a protocol.

In implementations of the disclosure, "protocol" may refer to a standard protocol in the field of communication, and may include, for example, an LTE protocol, an NR protocol, and a related protocol applicable to a future communication system, which is not limited in the disclosure.

To facilitate better understanding of implementations of the disclosure, discontinuous reception (DRX) related to the disclosure is described.

To reduce power consumption of a terminal device, a DRX mechanism is introduced in both an LTE and an NR system, so that in the case where the terminal device does not need to perform data reception, the terminal device enters a DRX state, and a receiver of the terminal device does not need to be always on, thereby realizing power saving. The DRX mechanism includes configuring a DRX cycle for a terminal device in a radio resource control (RRC) connected (RRC_CONNECTED) state, where the DRX cycle consists of an "on duration" and an "opportunity for DRX". During the "on duration", the terminal device monitors and receives a signal and a downlink channel including a physical downlink control channel (PDCCH). During the "opportunity for DRX", the terminal device does not need to receive a signal and a downlink channel such as a PDCCH to reduce power consumption. A terminal device in an RRC idle state needs to receive a paging message in a manner similar to DRX. A DRX cycle contains a paging occasion (PO), and the terminal device can receive a paging message only in the PO and does not receive a paging message in a time except the PO, thereby realizing power saving. In the PO, the terminal device determines whether there is a paging message by detecting a PDCCH scrambled by a paging radio network temporary identity (P-RNTI).

In the evolution of 5G, higher requirements are put forward for power saving of the terminal device. For example, for a DRX mechanism, during per on duration, the terminal device needs to continuously perform PDCCH detection to determine whether a base station has scheduled data transmission for the terminal device. However, most terminal devices may have no data transmission to-be-received during a long period of time, but still need to maintain a periodic wake-up mechanism to monitor possible downlink transmission. For the type of terminal devices, power saving can be further optimized. A case where the terminal device in the RRC idle state receives a paging message is similar to the above.

Figure 2:
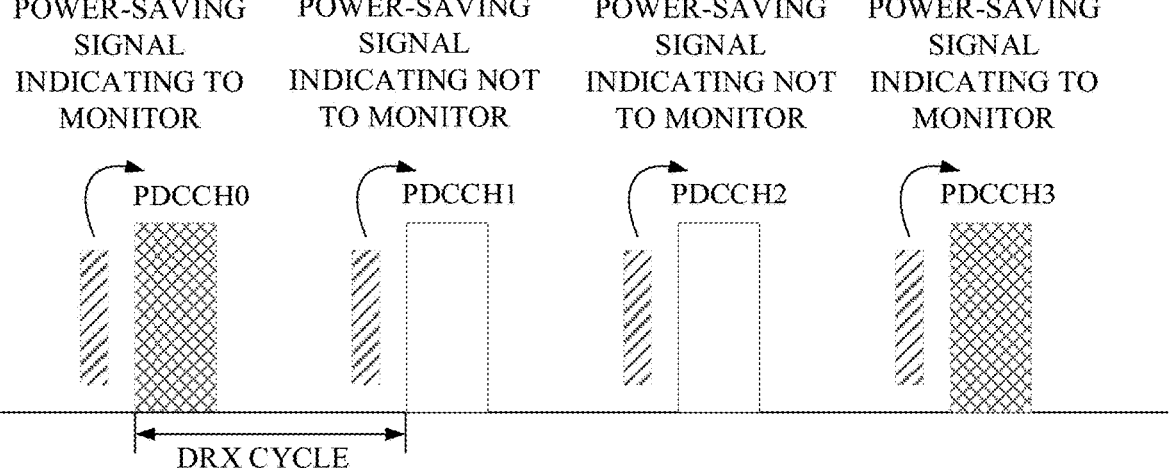
FIG. 2 is a schematic diagram illustrating that a power-saving signal indicates whether to monitor a physical downlink control channel (PDCCH) provided in the disclosure.

In a release 16 (Rel-16) standard, a power-saving signal is introduced to achieve further power saving. The power-saving signal is used in combination with the DRX mechanism, and the terminal device receives an indication of a power-saving wake-up signal before the DRX on duration. In the case where there is data transmission for the terminal device in a DRX cycle, the power-saving wake-up signal "wakes up" the terminal device, and the terminal device performs PDCCH monitoring during the DRX on duration. Otherwise, in the case where there is no data transmission for the terminal device in the DRX cycle, the power-saving wake-up signal does not "wake up" the terminal device, and the terminal device does not need to perform PDCCH monitoring during the DRX on duration. In the case where there is no data transmission for the terminal device, the terminal device performs no PDCCH monitoring during the DRX on duration, thereby realizing power saving. The terminal device being in a time except the DRX on duration is referred to as that the terminal device is in an inactive time, and the terminal device being in the DRX on duration is referred to as that the terminal device is in an active time. The process of indicating whether the terminal device is to perform PDCCH monitoring during the DRX on duration through the power-saving signal is illustrated in FIG. 2.

US 12,641,542 B2

7

Figure 3:
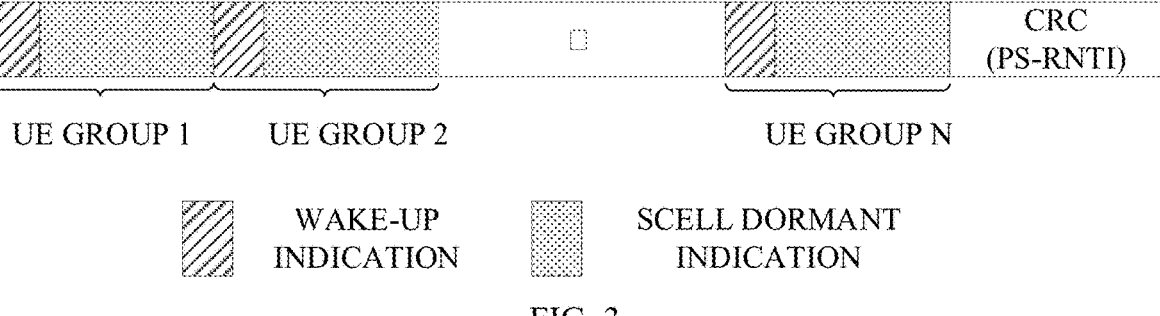
FIG. 3 is a schematic diagram illustrating that a power-saving wake-up signal carries power-saving signals for multiple users provided in the disclosure.

In the Rel-16 standard, the power-saving signal is carried in a newly-defined downlink control information (DCI) format 2_6. A network configures for the terminal device a search space set for detecting a PDCCH carrying the DCI format 2_6. In the power-saving signal, the number of bits for a single user is at most 6, where the 6 bits include 1 wake-up indication bit and at most 5 secondary cell (SCell) dormant indication bits. The power-saving signal carries indication bits for multiple users to improve resource utilization efficiency. As illustrated in FIG. 3, the network notifies each user of that a power-saving indication bit for each user is at a start position of DCI, and the number of bits for a single user can be implicitly obtained through the number of configured SCell (carrier) groups (the wake-up indication bit is necessarily contained, but there may be no SCell (carrier) dormant indication bit). Furthermore, the network also notifies the terminal device of the total number of bits of the DCI and a power saving-radio network temporary identity (PS-RNTI) for scrambling the PDCCH, and as illustrated in FIG. 3, the PS-RNTI for scrambling the PDCCH is indicated in a cyclic redundancy check (CRC) part.

There is a certain timing relationship between a PDCCH monitoring occasion and a time window of the DRX on duration. The network configures a power-saving offset (PS-offset) for determining a start point of a PDCCH monitoring occasion. After the start point of the PDCCH monitoring occasion is determined, an end point of the PDCCH monitoring occasion needs to be further determined, where the end point of the PDCCH monitoring occasion can be determined according to a device capability of the terminal device. The terminal device needs to perform operations such as device wake-up and initialization after wake-up in a minimum time gap before the DRX on duration. Therefore, the terminal device does not need to monitor the power-saving wake-up signal in the minimum time gap before the DRX on duration. A value of the minimum time gap for the terminal device with a relatively high processing speed may be small, e.g., may be value 1 in the following table 1. The value of the minimum time gap for the terminal device with a relatively low processing speed may be great, e.g., may be value 2 in table 1.

TABLE 1

| Sub-carrier | Minimum time gap (slot) | |
| spacing (kHz) | Value 1 | Value 2 |
| --- | --- | --- |
| 15 | 1 | 3 |
| 30 | 1 | 6 |
| 60 | 1 | 12 |
| 120 | 2 | 24 |

The power-saving signal is monitored in a whole PDCCH monitoring occasion (defined by a parameter "duration" in a PDCCH search space) after a start position of the PS-offset configured by the network, where a power-saving-signal monitoring position is before a time interval corresponding to the minimum time gap. As illustrated in FIG. 4, the terminal device monitors the power-saving signal in a monitoring occasion represented by a dashed frame.

In order to better understand implementations of the disclosure, paging and power saving related to the disclosure are described.

In an NR system, the network can perform paging on a terminal device in an idle state and a terminal device in an RRC connected state (RRC-Connected). The paging process may be triggered by a core network or a base station, to transmit a paging request to the terminal device in the idle state, or notify the terminal device in the idle state of system information update and notify the terminal device in the idle state to receive information such as an earthquake and tsunami warning system (ETWS), a commercial mobile alert system (CMAS), etc. After the base station receives a paging message from the core network, the base station can obtain a tracking area identity (TAI) list for the terminal device by parsing the paging message, and perform air interface paging on a cell in a tracking area, where the identity of the tracking area belongs to the TAI list. The paging message of the core network is not decoded by the base station but is transparently transmitted to the terminal device. After the base station receives the paging message from the core network, the base station combines paging messages for terminal devices having the same PO into one paging message, and transmits the paging message to relevant terminal devices through paging channels. The terminal device can receive a paging parameter via a system message, calculate a PO in conjunction with the paging parameter and an identifier (UE_ID) of the terminal device, and receive the paging message at a corresponding time. The paging message is carried in a physical downlink shared channel (PDSCH), and the terminal device can obtain paging indication information by detecting a PDCCH scrambled by a P-RNTI, and accordingly receive the paging message. Power saving of the terminal device in the idle state is achieved in the DRX manner, and the terminal device in the idle state can obtain DRX-related information from a system information block 2 (SIB2). The paging message can be received by monitoring a PDCCH scrambled by a P-RNTI in a PO in a paging frame (PF) in the DRX cycle.

The terminal device in the RRC idle/inactive state may consume a lot of power to periodically receive a paging message. In the Rel-17 standard, for power saving of the terminal device, a corresponding power-saving signal similar to the power-saving signal introduced in the Rel-16 is designed for the terminal device in the RRC idle/inactive state. One way is to use a paging early indication (PEI) to indicate whether the terminal device needs to receive a PDCCH carrying paging indication information in a target PO. The PEI may be carried in a PDCCH, a reference signal (RS), or a synchronization signal.

For the terminal device in the RRC idle/inactive state, before the terminal device performs paging detection in a corresponding PO, the terminal device needs to perform time-frequency tracking and automatic gain control (AGC). Since the terminal device in the idle state is not configured with an RS such as a channel state information-reference signal (CSI-RS) and a tracking reference signal (TRS), the terminal device can perform time-frequency synchronization by merely using a synchronization signal/physical broadcast channel block (SS/PBCH block) (hereinafter synchronization signal block (SSB)) transmitted periodically. In order to further reduce power consumption for paging reception, a CSI-RS and a TRS configured for the terminal device in the RRC idle state are introduced in the Rel-17 standard, where the CSI-RS and the TRS are used for the terminal device in the RRC idle state to perform time-frequency tracking.

For the terminal device in the RRC idle/inactive state, in order to save power, the terminal device does not need to perform detection in all CSI-RS/TRS transmission occasions. How to determine a CSI-RS/TRS transmission occasion in which the terminal device needs to perform detection is a problem to-be-solved.

Based on the above problems, a solution for determining an RS transmission occasion is proposed in the disclosure, which can determine a position of an available RS (such as TRS and/or CSI-RS) transmission occasion set, thereby realizing time-frequency tracking and power saving of a terminal device and realizing RS (such as TRS and/or CSI-RS) multi-beam transmission.

The technical solution of the disclosure is described in detail hereinafter with reference to specific implementations.

FIG. 5 is a schematic flow chart illustrating a method 200 for wireless communication according to implementations of the disclosure. As illustrated in FIG. 5, the method 200 includes at least part of the following.

At S210, a first device determines a target RS transmission occasion set according to whether a power-saving signal is detected or transmitted on a target resource set, and/or content indicated by the power-saving signal. The power-saving signal indicates whether a terminal device is to monitor in a target PO a PDCCH carrying paging indication information, and the target RS transmission occasion set contains RS transmission occasions for transmitting an RS.

In some implementations, the first device is a terminal device or a network device.

Specifically, in the case where the first device is the terminal device, the operation at S210 may specifically be the following. The first device determines the target RS transmission occasion set according to whether the power-saving signal is detected on the target resource set and/or according to the content indicated by the power-saving signal.

Specifically, in the case where the first device is the network device, the operation at S210 may specifically be the following. The first device determines the target RS transmission occasion set according to whether the power-saving signal is transmitted on the target resource set and/or according to the content indicated by the power-saving signal.

In some implementations, the RS may include, but is not limited to, at least one of a TRS or a CSI-RS.

In implementations of the disclosure, the network device performs RS transmission in the RS transmission occasions in the target RS transmission occasion set, and the terminal device performs RS detection in the RS transmission occasions in the target RS transmission occasion set.

In implementations of the disclosure, the terminal device is in an RRC idle state or an RRC inactive state.

It needs to be noted that RS (such as TRS and/or CSI-RS) configuration may be configured through a common message, such as a system message. An RS (such as TRS and/or CSI-RS) resource is periodic, that is, an RS (such as TRS and/or CSI-RS) transmission occasion periodically appears. However, in order to save power, the terminal device in the RRC idle state or the RRC inactive state does not need to perform RS (such as TRS and/or CSI-RS) reception in all transmission occasions. An RS (such as a TRS and/or a CSI-RS) is mainly used for the terminal device to perform time-frequency tracking, AGC, and the like before arrival of a PO. In the case where the terminal device does not need to perform paging reception in a PO, the terminal device does not need to perform RS (such as TRS and/or CSI-RS) detection, thereby realizing power saving.

In implementations of the disclosure, the RS transmission occasions in the target RS transmission occasion set may be part or all of RS transmission occasions configured by a network device. For example, the network device configures, through first configuration information, multiple RS transmission occasions for the terminal device, where the RS transmission occasions in the target RS transmission occasion set are part or all of the multiple RS transmission occasions. Specifically, the terminal device needs to perform RS detection in the RS transmission occasions in the target RS transmission occasion set, but does not perform RS detection in other RS transmission occasions configured by the network device. That is, the RS transmission occasions in the target RS transmission occasion set are available RS transmission occasions.

In some implementations, the power-save signal may be carried in at least one of a PDCCH, a TRS, a CSI-RS, or a secondary synchronization signal (SSS). That is, the target resource set may contain a resource position of a channel carrying the power-saving signal or a resource position of a signal carrying the power-saving signal.

In some implementations, an RS is used for time-frequency synchronization and/or AGC before the target PO.

In some implementations, the power-save signal is a PEI.

In some implementations, the operation at S210 may specifically be the following. On condition that the power-saving signal is detected or transmitted by the first device on the target resource set, and the power-saving signal indicates that a terminal device group or a terminal device sub-group where the terminal device is located is to monitor in the target PO the PDCCH carrying the paging indication information, the first device determines that the target RS transmission occasion set contains at least an RS transmission occasion for the power-saving signal or an RS transmission occasion for the target PO; and/or, on condition that the power-saving signal is detected or transmitted by the first device on the target resource set, and the power-saving signal indicates that the terminal device group or the terminal device sub-group where the terminal device is located is not to monitor in the target PO the PDCCH carrying the paging indication information, the first device determines that the target RS transmission occasion set contains no RS transmission occasion for the power-saving signal or no RS transmission occasion for the target PO; and/or, on condition that no power-saving signal is detected or transmitted by the first device on the target resource set, the first device determines that the target RS transmission occasion set contains no RS transmission occasion for the power-saving signal or no RS transmission occasion for the target PO, or the first device determines that the target RS transmission occasion set contains at least the RS transmission occasion for the power-saving signal or the RS transmission occasion for the target PO.

Figure 6:
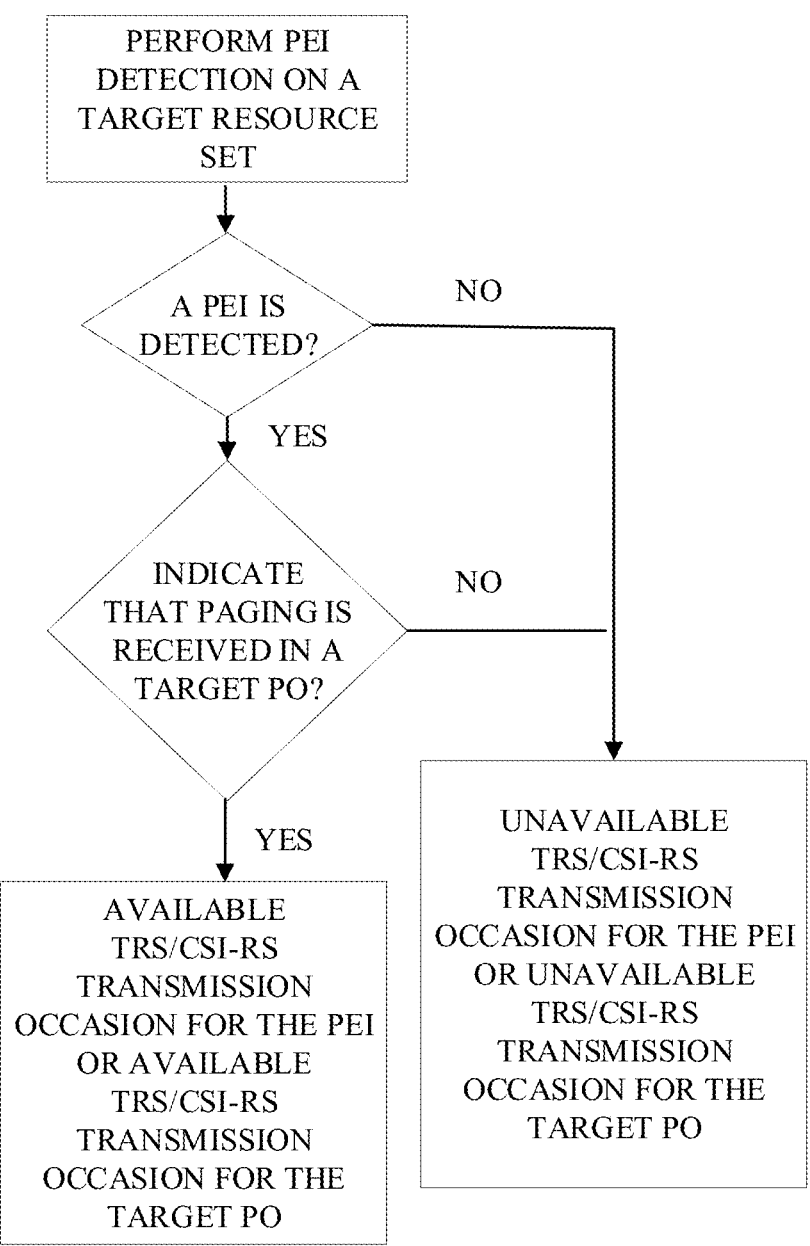
FIG. 6 is a schematic flow chart illustrating determination of whether a tracking reference signal (TRS)/channel state information-reference signal (CSI-RS) transmission occasion for a paging early indication (PEI) or a TRS/CSI-RS transmission occasion for a target paging occasion (PO) is available according to implementations of the disclosure.

As an example, as illustrated in FIG. 6, on condition that a PEI is detected by the terminal device on the target resource set and the PEI indicates that the terminal device group or the terminal device sub-group where the terminal device is located needs to monitor in the target PO the PDCCH carrying the paging indication information, i.e., indicates that the terminal device group or the terminal device sub-group is paged, TRS/CSI-RS transmission occasions for the PEI or TRS/CSI-RS transmission occasions for the target PO are available TRS/CSI-RS transmission occasions. The terminal device considers that TRS/CSI-RS transmission can be performed in these available TRS/CSI-RS transmission occasions, and the terminal device can perform TRS/CSI-RS detection in these available TRS/CSI-RS transmission occasions. On the contrary, on condition that no PEI is detected by the terminal device on the target resource set, these TRS/CSI-RS transmission occasions for the PEI or TRS/CSI-RS transmission occasions for the target PO are unavailable TRS/CSI-RS transmission occasions, and the terminal device does not need to perform TRS/CSI-RS detection in these unavailable TRS/CSI-RS transmission occasions. In addition, on condition that the PEI is detected by the terminal device on the target resource set and the PEI indicates that the terminal device group or the terminal device sub-group where the terminal device is located does not need to monitor the PDCCH carrying the paging indication information in the target PO, i.e., indicates that the terminal device group or the terminal device sub-group is not paged, these TRS/CSI-RS transmission occasions for the PEI or TRS/CSI-RS transmission occasions for the target PO are unavailable TRS/CSI-RS transmission occasions, and the terminal device does not need to perform TRS/CSI-RS detection in these unavailable TRS/CSI-RS transmission occasions.

In the example illustrated in FIG. 6, the PEI indicates that a terminal device group or a terminal device sub-group is paged, and the terminal device is to perform paging indication information monitoring in the target PO. On condition that no PEI is detected by the terminal device in all PEI monitoring occasions, the terminal device does not need to perform paging indication information monitoring in the target PO. As such, the number of PEI transmissions can be reduced, resource overhead for PEI transmission can be reduced, but there is a probability that the terminal device misses a PEI, resulting in missing paging.

Figure 7:
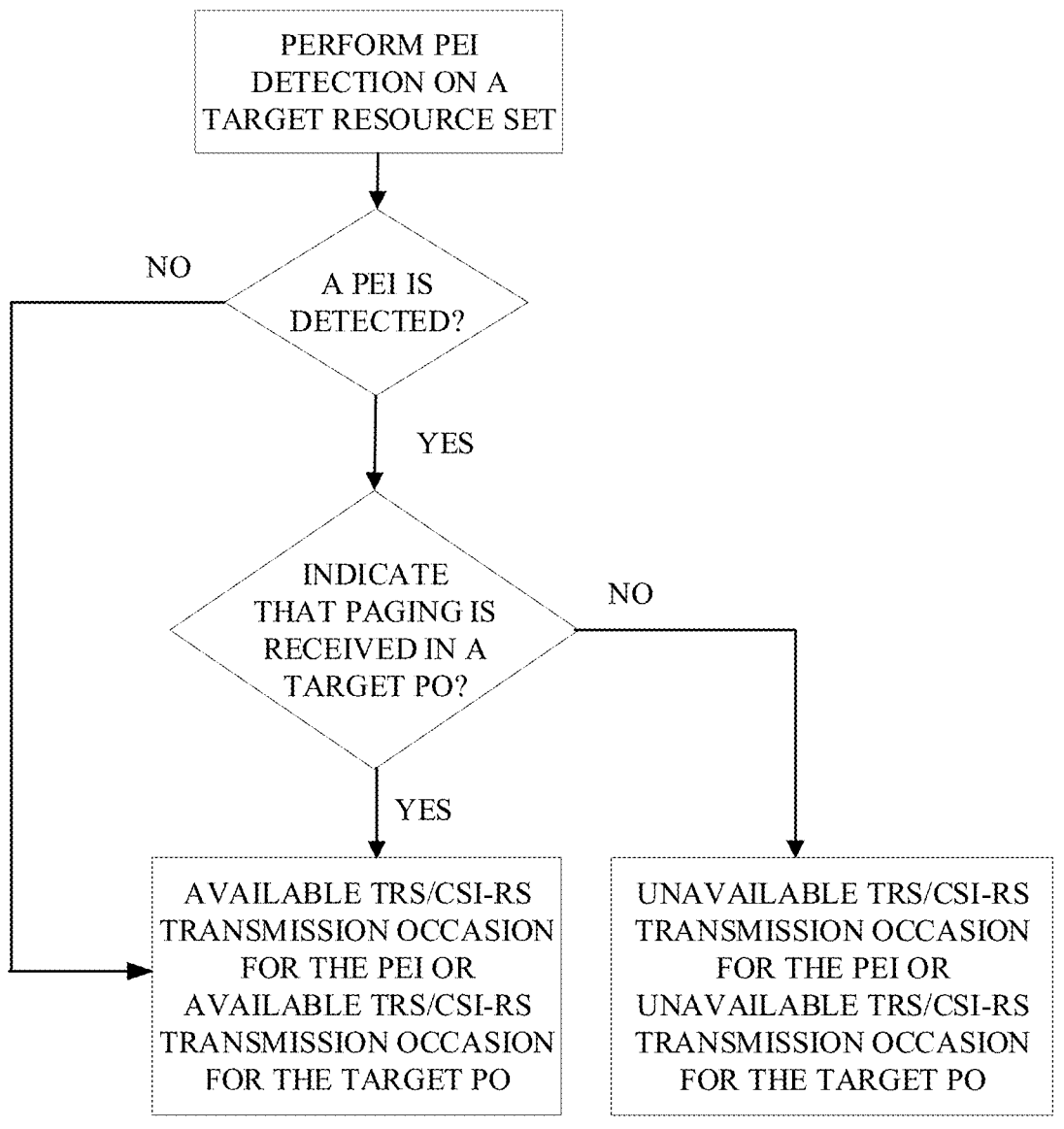
FIG. 7 is another schematic flow chart illustrating determination of whether a TRS/CSI-RS transmission occasion for a PEI or a TRS/CSI-RS transmission occasion for a target PO is available according to implementations of the disclosure.

As another example, as illustrated in FIG. 7, on condition that a PEI is detected by the terminal device on the target resource set and the PEI indicates that the terminal device group or the terminal device sub-group where the terminal device is located needs to monitor in the target PO the PDCCH carrying the paging indication information, i.e., indicates that the terminal device group or the terminal device sub-group is paged, TRS/CSI-RS transmission occasions for the PEI or TRS/CSI-RS transmission occasions for the target PO are available TRS/CSI-RS transmission occasions. The terminal device considers that TRS/CSI-RS transmission can be performed in these available TRS/CSI-RS transmission occasions and the terminal device can perform TRS/CSI-RS detection in these available TRS/CSI-RS transmission occasions. On condition that the PEI is detected by the terminal device on the target resource set and the PEI indicates that the terminal device group or the terminal device sub-group where the terminal device is located does not need to monitor the PDCCH carrying the paging indication information in the target PO, i.e., indicates that the terminal device group or the terminal device sub-group is not paged, these TRS/CSI-RS transmission occasions for the PEI or TRS/CSI-RS transmission occasions for the target PO are unavailable TRS/CSI-RS transmission occasions, and the terminal device does not need to perform TRS/CSI-RS detection in these unavailable TRS/CSI-RS transmission occasions. On condition that no PEI is detected by the terminal device on the target resource set, the terminal device considers that these TRS/CSI-RS transmission occasions for the PEI or TRS/CSI-RS transmission occasions for the target PO are available TRS/CSI-RS transmission occasions, and the terminal device can perform TRS/CSI-RS detection in these available TRS/CSI-RS transmission occasions.

In the example illustrated in FIG. 7, the PEI indicates that a terminal device group or a terminal device sub-group is paged, and the terminal device is to perform paging indication information monitoring in the target PO. On condition that no PEI is detected by the terminal device in all PEI monitoring occasions, the terminal device needs to perform paging indication information monitoring in the target PO.

As such, paging missing can be avoided in the case of PEI missing, but a disadvantage is that overhead for PEI transmission is relatively great, especially in a case where a probability of being paged is relatively low.

In some implementations, the RS transmission occasion for the power-saving signal or the RS transmission occasion for the target PO is determined according to a first time offset.

In some implementations, the RS transmission occasion for the power-saving signal or the RS transmission occasion for the target PO includes part or all of RS transmission occasions in a first duration corresponding to the first time offset, where the first time offset is used for determining a start position of the first duration.

In some implementations, the first time offset is preconfigured, agreed by a protocol, or configured by the network device.

Figure 8:
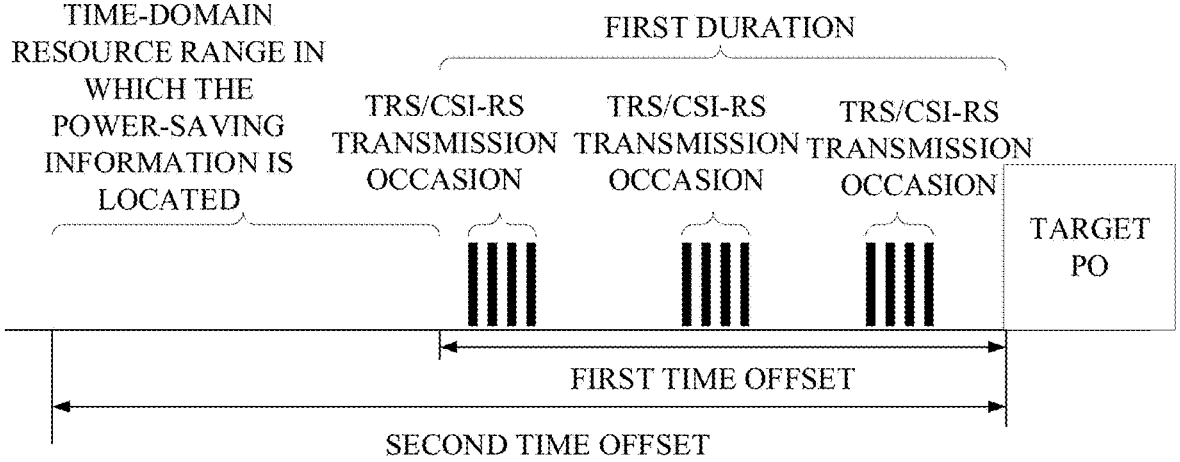
FIG. 8 is a schematic diagram of TRS/CSI-RS transmission occasions for a PEI or TRS/CSI-RS transmission occasions for a target PO according to implementations of the disclosure.

Specifically, as illustrated in FIG. 8, the first duration may be a time gap between an end time of a duration in which a power-saving-signal monitoring occasion is located (namely, a time-domain resource range in which the power-saving signal is transmitted) and a start time of the target PO. The first duration is determined by the first time offset, and the first duration is generally related to a capability of the terminal device or related to a requirement of performing time-frequency tracking before the target PO. A time gap between a start time of the duration in which the power-saving-signal monitoring occasion is located (namely, the time-domain resource range in which the power-saving signal is transmitted) and the start time of the target PO is determined by a second time offset and is generally configured through a network. In the first duration, the terminal device can perform time-frequency tracking through a TRS/CSI-RS, to prepare for paging reception in the target PO. As illustrated in FIG. 8, three TRS/CSI-RS occasions are in the first duration, and the three TRS/CSI-RS occasions are TRS/CSI-RS occasions for the PEI or TRS/CSI-RS occasions for the target PO.

It is to be noted that, in the NR technology, for the terminal device in the idle state, the base station does not know which beam is used to transmit paging to the terminal device, and thus the base station transmits paging through beam scanning. In order to support multi-beam transmission of paging, one PO is defined to contain a set of PDCCH monitoring occasions, and one PF may contain one or more POs or a start time of each of POs. In the case where a search space identifier (SearchSpaceId) of a paging search space is 0, since each SSB index corresponds to a PDCCH monitoring occasion and different SSB indexes respectively correspond to different beams, multi-beam transmission of paging can be supported through multiple PDCCH monitoring occasions respectively corresponding to multiple different SSB indexes in one PO. In the case where the SearchSpaceId of the paging search space is not 0, one PO contains "S*X" continuous PDCCH monitoring occasions, where S represents the number of actually transmitted SSBs and is indicated by SSB positions in burst (ssb-PositionsInBurst) in SIB1. X is indicated by a parameter nrofPDCCH-MonitoringOccasionPerSSB-InPO, and represents the number of PDCCH monitoring occasions per SSB. When the parameter nrofPDCCH-MonitoringOccasionPerSSB-InPO is not configured, X is 1. A [x*S+K]-th PDCCH monitoring occasion in a PO corresponds to a K-th actually transmitted SSB, where x=0, 1, . . . , X−1, and K=1, 2, . . . , S. For example, on condition that S=8 and X=2, one PO contains 16 PDCCH monitoring occasions, where SSB indexes corresponding to the 16 PDCCH monitoring occasions in a time sequence are respectively "0123456701234567", and 8 SSB indexes of the SSB indexes are respectively 0 to 7.

For PEI transmission, multiple monitoring occasions are also required for multi-beam transmission. A PEI monitoring occasion set may be in a correspondence with the multiple PDCCH monitoring occasions in the target PO, or in a correspondence with multiple SSBs or multiple RSs.

For resource configuration of a TRS/CSI-RS, configuration information such as qcl-InfoPeriodicCSI-RS can indicate QCL information of the TRS/CSI-RS. Therefore, for different TRS/CSI-RS resource configurations, QCL information of each TRS/CSI-RS resource configuration indicates that the TRS/CSI-RS resource configuration has a QCL relation with an SSB or a CSI-RS resource, and indicates a QCL type.

In some implementations, the RS transmission occasions in the target RS transmission occasion set are in a first correspondence with PDCCH monitoring occasions in a PDCCH monitoring occasion set in the target PO.

Specifically, the first device can determine the target RS transmission occasion set according to the PDCCH monitoring occasions in the PDCCH monitoring occasion set in the target PO and the first correspondence, thereby realizing RS multi-beam transmission.

In some implementations, the number of the PDCCH monitoring occasions in the PDCCH monitoring occasion set in the target PO is equal to a product of a first parameter and the number of the actually transmitted SSBs indicated by the ssb-PositionsInBurst, where the first parameter indicates the number of PDCCH monitoring occasions per SSB.

The ssb-PositionsInBurst may be obtained from, for example, SIB1. The first parameter may be the parameter X determined according to the nrofPDCCH-MonitoringOccasionPerSSB-InPO. The number of the actually transmitted SSBs indicated by the ssb-PositionsInBurst may be the parameter S. The number of the PDCCH monitoring occasions in the target PO may be S*X.

In some implementations, in the first correspondence, the RS transmission occasions are in one-to-one correspondence with the PDCCH monitoring occasions, or the RS transmission occasions are in one-to-multiple correspondence with the PDCCH monitoring occasions, or the RS transmission occasions are in multiple-to-one correspondence with the PDCCH monitoring occasions, or the RS transmission occasions are quasi co-located with the PDCCH monitoring occasions.

In some implementations, the first correspondence is preconfigured, agreed by a protocol, or configured by the network device.

Figure 9:
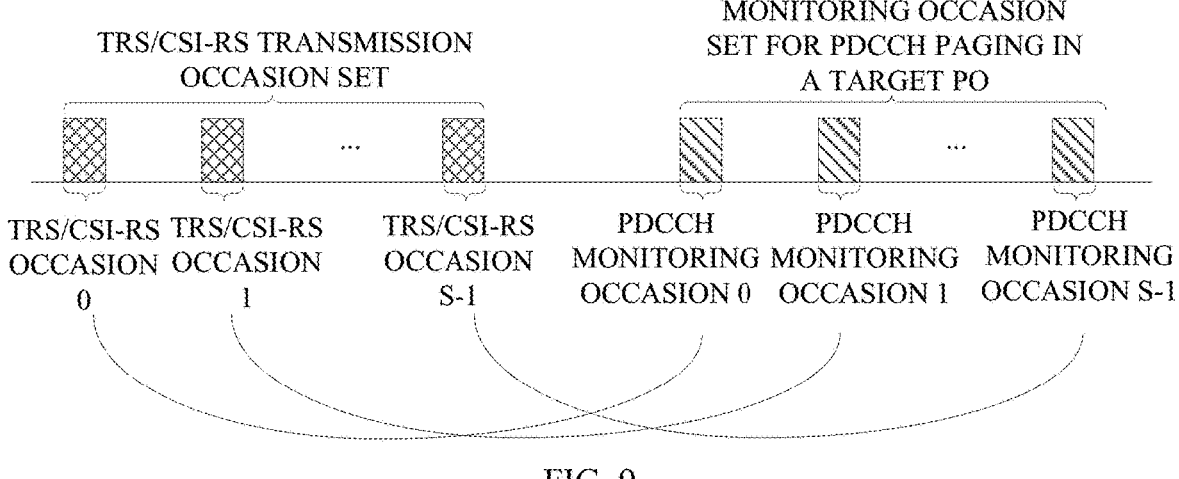
FIG. 9 is a schematic diagram illustrating a correspondence between TRS/CSI-RS transmission occasions and PDCCH monitoring occasions in a target PO according to implementations of the disclosure.

Specifically, the target RS transmission occasion set contains "S*X" transmission occasions, and the "S*X" transmission occasions are in the first correspondence with "S*X" PDCCH monitoring occasions in the PDCCH monitoring occasion set in the target PO, for example, in a one-to-one correspondence according to a time sequence. For example, a [x*S+K]-th transmission occasion in the "S*X" RS transmission occasions corresponds to a K-th actually transmitted SSB, where x=0, 1, . . . , X−1, K=1, 2, . . . , S. Furthermore, for the transmission occasions in the target RS transmission occasion set, the parameter X may not be used or X is set to 1 by default. The number of the transmission occasions in the target RS transmission occasion set is only related to the number of the actually transmitted SSBs indicated by the ssb-PositionsInBurst, thereby realizing RS (such as TRS and/or CSI-RS) multi-beam transmission. For example, "S" RS transmission occasions determined are in the first correspondence with "S*X"

monitoring occasions for PDCCH paging in the target PO, where the K-th RS transmission occasion corresponds to X monitoring occasions for PDCCH paging, and the X monitoring occasions for PDCCH paging correspond to the same value of K, i.e., correspond to the same SSB index. FIG. 9 is a schematic diagram illustrating that S TRS/CSI-RS monitoring occasions correspond to S monitoring occasions for PDCCH paging.

In some implementations, the RS transmission occasions in the target RS transmission occasion set are in a second correspondence with SSBs in an SSB set.

In some implementations, in the second correspondence, the RS transmission occasions are in one-to-one correspondence with the SSBs, or the RS transmission occasions are in one-to-multiple correspondence with the SSBs, or the RS transmission occasions are in multiple-to-one correspondence with the SSBs, or the RS transmission occasions are quasi co-located with the SSBs.

In some implementations, the SSB in the SSB set are the actually transmitted SSBs indicated by the ssb-PositionsInBurst.

In some implementations, the second correspondence is preconfigured, agreed by a protocol, or configured by the network device.

In some implementations, the RS transmission occasions in the target RS transmission occasion set are in a third correspondence with power-saving-signal monitoring occasions in a power-saving-signal monitoring occasion set corresponding to the target PO.

For example, the power-saving-signal monitoring occasion set corresponding to the target PO may be a PEI monitoring occasion set.

In some implementations, in the third correspondence, the RS transmission occasions are in one-to-one correspondence with the power-saving-signal monitoring occasions, or the RS transmission occasions are in one-to-multiple correspondence with the power-saving-signal monitoring occasions, or the RS transmission occasions are in multiple-to-one correspondence with the power-saving-signal monitoring occasions, or the RS transmission occasions are quasi co-located with the power-saving-signal monitoring occasions.

In some implementations, the power-saving-signal monitoring occasions in the power-saving-signal monitoring occasion set are located in the target resource set.

In some implementations, the third correspondence is preconfigured, agreed by a protocol, or configured by the network device.

Figure 10:
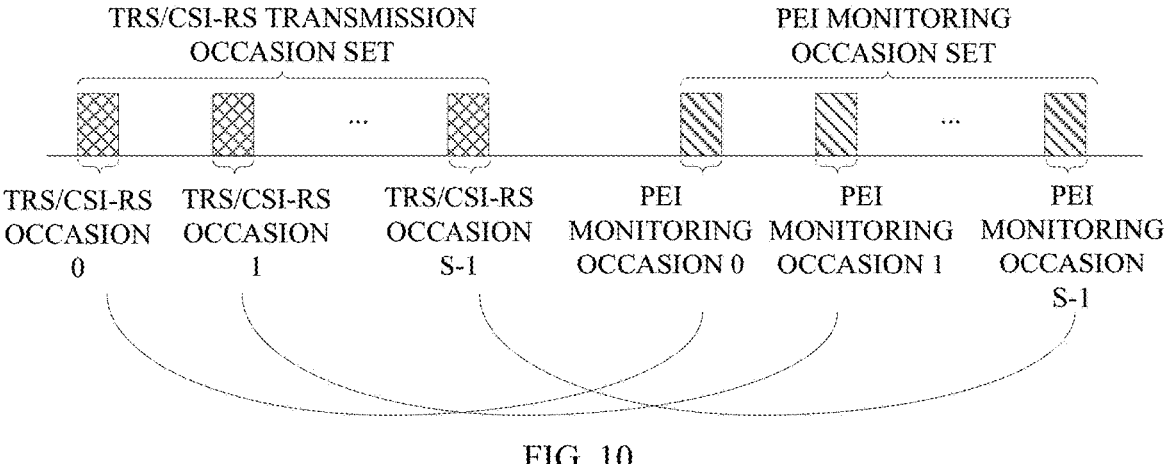
FIG. 10 is a schematic diagram illustrating a correspondence between TRS/CSI-RS transmission occasions and PEI monitoring occasions according to implementations of the disclosure.

As an example, the third correspondence may be, for example, illustrated in FIG. 10. S TRS/CSI-RS occasions in the TRS/CSI-RS transmission occasion set (namely, the target RS transmission occasion set) correspond to S PEI monitoring occasions in the PEI monitoring occasion set (namely, the power-saving-signal monitoring occasion set corresponding to the target PO), and the TRS/CSI-RS transmission occasion set is before the PEI monitoring occasion set.

Figure 11:
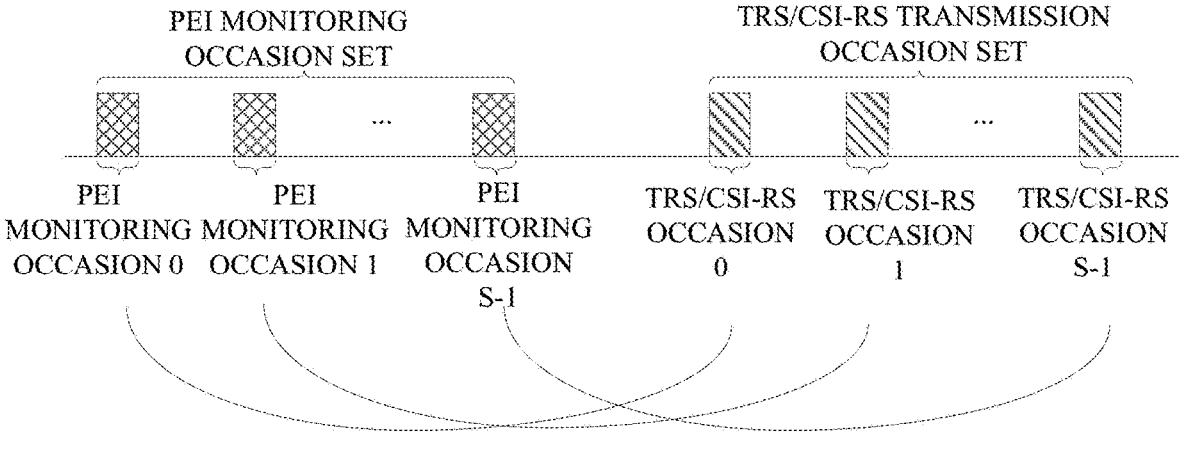
FIG. 11 is another schematic diagram illustrating a correspondence between TRS/CSI-RS transmission occasions and PEI monitoring occasions according to implementations of the disclosure.

As another example, the third correspondence may be, for example, illustrated in FIG. 11. The S TRS/CSI-RS occasions in the TRS/CSI-RS transmission occasion set (namely, the target RS transmission occasion set) correspond to the S PEI monitoring occasions in the PEI monitoring occasion set (namely, the power-saving-signal monitoring occasion set corresponding to the target PO), and the TRS/CSI-RS transmission occasion set is after the PEI monitoring occasion set.

In some implementations, RS resources in an RS resource set are in a fourth correspondence with SSBs in an SSB set, where each RS transmission occasion in the target RS transmission occasion set corresponds to one RS resource in the RS resource set.

In some implementations, in the fourth correspondence, the RS resources are in one-to-one correspondence with the SSBs, or the RS resources are in one-to-multiple correspondence with the SSBs, or the RS resources are in multiple-to-one correspondence with the SSBs, or the RS resources are quasi co-located with the SSBs.

In some implementations, the SSBs in the SSB set are the actually transmitted SSBs indicated by the ssb-PositionsIn-Burst.

In some implementations, the fourth correspondence is preconfigured, agreed by a protocol, or configured by the network device.

For example, the network device configures the terminal device with a TRS/CSI-RS resource set, where QCL information configuration of TRS/CSI-RS resources in the TRS/CSI-RS resource set indicates that the TRS/CSI-RS resources in the TRS/CSI-RS resource set are in a QCL relation (namely, the fourth correspondence) with the SSBs in the SSB set. For example, the TRS/CSI-RS resource set contains S TRS/CSI-RS resources, and the S TRS/CSI-RS resources are in the QCL relation with S SSBs in the SSB set. The TRS/CSI-RS transmission occasion set contains occasions for the S TRS/CSI-RS resources, for example, S occasions, and each occasion corresponds to one TRS/CSI-RS resource.

Therefore, in implementations of the disclosure, the first device can determine the target RS transmission occasion set according to whether the power-saving signal is detected or transmitted on the target resource set, and/or, according to the content indicated by the power-saving signal. That is, a position of an available RS (such as TRS and/or CSI-RS) transmission occasion set can be determined according to whether the power-saving signal is detected or transmitted on the target resource set, and/or, according to the content indicated by the power-saving signal, thereby realizing time-frequency tracking and power saving of the terminal device, and realizing RS (such as TRS and/or CSI-RS) multi-beam transmission.

FIG. 12 is a schematic flow chart illustrating a method 300 for wireless communication according to implementations of the disclosure. As illustrated in FIG. 12, the method 300 includes at least part of the following.

At S310, a first device determines a target RS transmission occasion set. RS transmission occasions in the target RS transmission occasion set are in a first correspondence with PDCCH monitoring occasions in a PDCCH monitoring occasion set in a target PO, or the RS transmission occasions in the target RS transmission occasion set are in a second correspondence with SSBs in an SSB set, or the RS transmission occasions in the target RS transmission occasion set are in a third correspondence with power-saving-signal monitoring occasions in a power-saving-signal monitoring occasion set corresponding to the target PO, or RS resources in an RS resource set are in a fourth correspondence with the SSBs in the SSB set. Each RS transmission occasion in the target RS transmission occasion set corresponds to one RS resource in the RS resource set.

In some implementations, the first device is a terminal device or a network device.

In some implementations, the RS may include, but is not limited to, at least one of a TRS or a CSI-RS.

In implementations of the disclosure, the network device performs RS transmission in the RS transmission occasions in the target RS transmission occasion set, and the terminal device performs RS detection in the RS transmission occasions in the target RS transmission occasion set.

In implementations of the disclosure, the terminal device is in an RRC idle state or an RRC inactive state.

It needs to be noted that RS (such as TRS and/or CSI-RS) configuration may be configured through a common message, such as a system message. An RS (such as TRS and/or CSI-RS) resource is periodic, that is, an RS (such as TRS and/or CSI-RS) transmission occasion periodically appears. However, in order to save power, the terminal device in the RRC idle state or the RRC inactive state does not need to perform RS (such as TRS and/or CSI-RS) reception in all transmission occasions. An RS (such as a TRS and/or a CSI-RS) is mainly used for the terminal device to perform time-frequency tracking, AGC, and the like before arrival of a PO. In the case where the terminal device does not need to perform paging reception in a PO, the terminal device does not need to perform RS (such as TRS and/or CSI-RS) detection, thereby realizing power saving.

In implementations of the disclosure, the RS transmission occasions in the target RS transmission occasion set may be part or all of RS transmission occasions configured by the network device. For example, the network device configures, through first configuration information, multiple RS transmission occasions for the terminal device, where the RS transmission occasions in the target RS transmission occasion set are part or all of the multiple RS transmission occasions. Specifically, the terminal device needs to perform RS detection in the RS transmission occasions in the target RS transmission occasion set, but does not perform RS detection in other RS transmission occasions configured by the network device. That is, the RS transmission occasions in the target RS transmission occasion set are available RS transmission occasions.

In some implementations, the power-save signal may be carried in at least one of a PDCCH, a TRS, a CSI-RS, or an SSS.

In some implementations, the power-save signal is a PEI.

In some implementations, an RS is used for time-frequency synchronization and/or AGC before the target PO, and/or the RS is used for time-frequency synchronization and/or AGC before the power-saving signal (e.g., the PEI).

It is to be noted that, in the NR technology, for the terminal device in the idle state, the base station does not know which beam is used to transmit paging to the terminal device, and thus the base station transmits paging through beam scanning. In order to support multi-beam transmission of paging, one PO is defined to contain a set of PDCCH monitoring occasions, and one PF may contain one or more POs or a start time of each of POs. In the case where a SearchSpaceId of a paging search space is 0, since each SSB index corresponds to a PDCCH monitoring occasion and different SSB indexes respectively correspond to different beams, multi-beam transmission of paging can be supported through multiple PDCCH monitoring occasions respectively corresponding to multiple different SSB indexes in one PO. In the case where the SearchSpaceId of the paging search space is not 0, one PO contains "S*X" continuous PDCCH monitoring occasions, where S represents the number of actually transmitted SSBs and is indicated by ssb-PositionsInBurst in SIB1. X is indicated by a parameter nrofPDCCH-MonitoringOccasionPerSSB-InPO, and represents the number of PDCCH monitoring occasions per SSB. When the parameter nrofPDCCH-MonitoringOccasion-PerSSB-InPO is not configured, X is 1. A $[x*S+K]$-th PDCCH monitoring occasion in a PO corresponds to a K-th actually transmitted SSB, where $x=0, 1, \ldots, X-1$, and $K=1$, 2, . . . , S. For example, on condition that S=8, and X=2, one PO contains 16 PDCCH monitoring occasions, where SSB indexes corresponding to the 16 PDCCH monitoring occasions in a time sequence are respectively "0123456701234567", and 8 SSB indexes of the SSB indexes are respectively 0 to 7.

For PEI transmission, multiple monitoring occasions are also required for multi-beam transmission. A PEI monitoring occasion set may be in a correspondence with the multiple PDCCH monitoring occasions in the target PO, or in a correspondence with multiple SSBs or multiple RSs.

For resource configuration of a TRS/CSI-RS, configuration information such as qcl-InfoPeriodicCSI-RS can indicate QCL information of the TRS/CSI-RS. Therefore, for different TRS/CSI-RS resource configurations, QCL information of each TRS/CSI-RS resource configuration indicates that the TRS/CSI-RS resource configuration has a QCL relation with an SSB or a CSI-RS resource, and indicates a QCL type.

In some implementations, in the case where the RS transmission occasions in the target RS transmission occasion set are in the first correspondence with the PDCCH monitoring occasions in the PDCCH monitoring occasion set in the target PO, the operation at S310 may specifically be the following. The first device determines the target RS transmission occasion set according to the PDCCH monitoring occasions in the target PO and the first correspondence.

In some implementations, the number of the PDCCH monitoring occasions in the PDCCH monitoring occasion set in the target PO is equal to a product of a first parameter and the number of the actually transmitted SSBs indicated by the ssb-PositionsInBurst, where the first parameter indicates the number of PDCCH monitoring occasions per SSB.

The ssb-PositionsInBurst may be obtained from, for example, SIB1. The first parameter may be the parameter X determined according to the nrofPDCCH-MonitoringOccasionPerSSB-InPO. The number of the actually transmitted SSBs indicated by the ssb-PositionsInBurst may be the parameter S. The number of the PDCCH monitoring occasions in the target PO may be S*X.

In some implementations, in the first correspondence, the RS transmission occasions are in one-to-one correspondence with the PDCCH monitoring occasions, or the RS transmission occasions are in one-to-multiple correspondence with the PDCCH monitoring occasions, or the RS transmission occasions are in multiple-to-one correspondence with the PDCCH monitoring occasions, or the RS transmission occasions are quasi co-located with the PDCCH monitoring occasions.

In some implementations, the first correspondence is preconfigured, agreed by a protocol, or configured by the network device.

Specifically, the target RS transmission occasion set contains "S*X" transmission occasions, and the "S*X" transmission occasions are in the first correspondence with "S*X" PDCCH monitoring occasions in the PDCCH monitoring occasion set in the target PO, for example, in a one-to-one correspondence according to a time sequence. For example, a [x*S+K]-th transmission occasion in the "S*X" RS transmission occasions corresponds to a K-th actually transmitted SSB, where x=0, 1, . . . , X−1, K=1, 2, . . . , S. Furthermore, for the transmission occasions in the target RS transmission occasion set, the parameter X may not be used or X is set to 1 by default. The number of the transmission occasions in the target RS transmission occasion set is only related to the number of the actually transmitted SSBs indicated by the ssb-PositionsInBurst, thereby realizing RS (such as TRS and/or CSI-RS) multi-beam transmission. For example, "S" RS transmission occasions determined are in the first correspondence with "S*X" monitoring occasions for PDCCH paging in the target PO, where the K-th RS transmission occasion corresponds to X monitoring occasions for PDCCH paging, and the X monitoring occasions for PDCCH paging correspond to the same value of K, i.e., correspond to the same SSB index. FIG. 9 is a schematic diagram illustrating that S TRS/CSI-RS monitoring occasions correspond to S monitoring occasions for PDCCH paging.

In some implementations, in the case where the RS transmission occasions in the target RS transmission occasion set are in the second correspondence with the SSBs in the SSB set, the operation at S310 may specifically be the following. The first device determines the target RS transmission occasion set according to the SSBs in the SSB set and the second correspondence.

In some implementations, the SSBs in the SSB set are the actually transmitted SSBs indicated by the ssb-PositionsInBurst.

In some implementations, in the second correspondence, the RS transmission occasions are in one-to-one correspondence with the SSBs, or the RS transmission occasions are in one-to-multiple correspondence with the SSBs, or the RS transmission occasions are in multiple-to-one correspondence with the SSBs, or the RS transmission occasions are quasi co-located with the SSBs.

In some implementations, the second correspondence is preconfigured, agreed by a protocol, or configured by the network device.

In some implementations, in the case where the RS transmission occasions in the target RS transmission occasion set are in the third correspondence with the power-saving-signal monitoring occasions in the power-saving-signal monitoring occasion set corresponding to the target PO, the operation at S310 may specifically be the following. The first device determines the target RS transmission occasion set according to the power-saving-signal monitoring occasions in the power-saving-signal monitoring occasion set corresponding to the target PO and the third correspondence.

In some implementations, in the third correspondence, the RS transmission occasions are in one-to-one correspondence with the power-saving-signal monitoring occasions, or the RS transmission occasions are in one-to-multiple correspondence with the power-saving-signal monitoring occasions, or the RS transmission occasions are in multiple-to-one correspondence with the power-saving-signal monitoring occasions, or the RS transmission occasions are quasi co-located with the power-saving-signal monitoring occasions.

In some implementations, the third correspondence is preconfigured, agreed by a protocol, or configured by the network device.

As an example, the third correspondence may be, for example, illustrated in FIG. 10. S TRS/CSI-RS occasions in the TRS/CSI-RS transmission occasion set (namely, the target RS transmission occasion set) correspond to S PEI monitoring occasions in the PEI monitoring occasion set (namely, the power-saving-signal monitoring occasion set corresponding to the target PO), and the TRS/CSI-RS transmission occasion set is before the PEI monitoring occasion set.

As another example, the third correspondence may be, for example, illustrated in FIG. 11. The S TRS/CSI-RS occasions in the TRS/CSI-RS transmission occasion set (namely, the target RS transmission occasion set) correspond to the S PEI monitoring occasions in the PEI monitoring occasion set (namely, the power-saving-signal monitoring occasion set corresponding to the target PO), and the TRS/CSI-RS transmission occasion set is after the PEI monitoring occasion set.

In some implementations, in the case where the RS resources in the RS resource set are in the fourth correspondence with the SSBs in the SSB set, the operation at S310 may be specifically the following. The first device determines the RS resource set according to the SSBs in the SSB set and the fourth correspondence, and determines the target RS transmission occasion set according to the RS resources in the RS resource set.

In some implementations, in the fourth correspondence, the RS resources are in one-to-one correspondence with the SSBs, or the RS resources are in one-to-multiple correspondence with the SSBs, or the RS resources are in multiple-to-one correspondence with the SSBs, or the RS resources are quasi co-located with the SSBs.

In some implementations, the fourth correspondence is preconfigured, agreed by a protocol, or configured by the network device.

In some implementations, the SSBs in the SSB set are the actually transmitted SSBs indicated by the ssb-PositionsIn-Burst.

For example, the network device configures the terminal device with a TRS/CSI-RS resource set, where QCL information configured of TRS/CSI-RS resources in the TRS/CSI-RS resource set indicates that the TRS/CSI-RS resources in the TRS/CSI-RS resource set are in a QCL relation (namely, the fourth correspondence) with the SSBs in the SSB set. For example, the TRS/CSI-RS resource set contains S TRS/CSI-RS resources, and the S TRS/CSI-RS resources are in the QCL relation with S SSBs in the SSB set. The TRS/CSI-RS transmission occasion set contains occasions for the S TRS/CSI-RS resources, for example, S occasions, and each occasion corresponds to one TRS/CSI-RS resource.

It is to be noted that the TRS/CSI-RS transmission occasions are used for the terminal device, which needs to perform paging indication information detection in the PO, to perform time-frequency tracking. However, for PEI reception, for example, reception of a PEI carried in a PDCCH, time-frequency tracking and AGC are also required, but the requirements in the case of PEI reception may be lower than requirements in the case of paging indication information detection in the PO. To this end, before the terminal device performs PEI reception, an available TRS/CSI-RS transmission occasion is required for time-frequency tracking and AGC.

In some implementations, the operation at S310 may specifically be the following. The first device determines the target RS transmission occasion set according to a resource position of a channel carrying the power-saving signal or a resource position of a signal carrying the power-saving signal, where the power-saving signal indicates whether a terminal device is to monitor in the target PO a PDCCH carrying paging indication information.

In some implementations, the power-save signal may be carried in at least one of a PDCCH, a TRS, a CSI-RS, or an SSS.

In some implementations, the target RS transmission occasion set contains N RS transmission occasions before the resource position of the channel carrying the power-saving signal or the resource position of the signal carrying the power-saving signal, and N is a positive integer.

In some implementations, N is preconfigured, agreed by a protocol, or configured by the network device.

For example, as illustrated in FIG. 13, a time gap in which a PEI monitoring occasion is located (namely, a time-domain resource range in which the power-saving signal is located) is determined by a PEI time offset 1 and a PEI time offset 2. The available TRS/CSI-RS transmission occasions are several occasions located before a start time of the time gap in which the PEI monitoring occasion is located (namely, the time-domain resource range in which the power-saving signal is located). Specifically, the available TRS/CSI-RS transmission occasions are N occasions closest to the start time of the time gap in which the PEI monitoring occasion is located (namely, the time-domain resource range in which the power-saving signal is located), where N may be pre-defined or configured by the network.

In some implementations, the first device determines the target RS transmission occasion set according to a first time offset. The target RS transmission occasion set contains part or all of RS transmission occasions in a first duration corresponding to the first time offset, and the first time offset is used for determining a start position of the first duration.

In some implementations, the first time offset is preconfigured, agreed by a protocol, or configured by the network device.

For example, as illustrated in FIG. 14, the network device may configure the first time offset, which may be an offset relative to the start time of the time gap in which the PEI monitoring occasion is located (namely, the time-domain resource range in which the power-saving signal is located). The available TRS/CSI-RS transmission occasions are part or all of the TRS/CSI-RS transmission occasions in the first duration corresponding to the first time offset.

In some implementations, the first device determines the target RS transmission occasion set according to a second time offset and the resource position of the channel carrying the power-saving signal or the resource position of the signal carrying the power-saving signal. The second time offset is an offset between a start position of the target PO and a start position of the first duration, and the target RS transmission occasion set is located in the first duration.

In some implementations, the second time offset is preconfigured, agreed by a protocol, or configured by the network device.

Therefore, in implementations of the disclosure, the first device can determine the target RS transmission occasion set. In other words, a position of an available RS (such as TRS and/or CSI-RS) transmission occasion set can be determined, thereby realizing time-frequency tracking and power saving of the terminal device, and realizing RS (such as TRS and/or CSI-RS) multi-beam transmission.

The method implementations of the disclosure are described in detail in the foregoing with reference to FIGS. 5 to 14, and the apparatus implementations of the disclosure are described in detail in the following with reference to FIGS. 15 to 19. It is to be understood that the apparatus implementations correspond to the method implementations, and for similar description, reference may be made to the method implementations.

FIG. 15 illustrates a schematic block diagram of a device 400 for wireless communication according to implementations of the disclosure. The device 400 for wireless communication is a first device. As illustrated in FIG. 15, the device 400 for wireless communication includes a processing unit 410. The processing unit 410 is configured to determine a target RS transmission occasion set according to whether a power-saving signal is detected or transmitted on a target resource set, and/or, according to content indicated by the power-saving signal. The power-saving signal indicates whether a terminal device is to monitor in a target PO a PDCCH carrying paging indication information, and the target RS transmission occasion set contains RS transmission occasions for transmitting an RS.

In some implementations, the processing unit 410 is specifically configured to: determine that the target RS transmission occasion set contains at least an RS transmission occasion for the power-saving signal or an RS transmission occasion for the target PO, on condition that the power-saving signal is detected or transmitted by the first device on the target resource set, and the power-saving signal indicates that a terminal device group or a terminal device sub-group where the terminal device is located is to monitor in the target PO the PDCCH carrying the paging indication information; and/or, determine that the target RS transmission occasion set contains no RS transmission occasion for the power-saving signal or no RS transmission occasion for the target PO, on condition that the power-saving signal is detected or transmitted by the first device on the target resource set, and the power-saving signal indicates that the terminal device group or the terminal device sub-group where the terminal device is located is not to monitor in the target PO the PDCCH carrying the paging indication information; and/or, determine that the target RS transmission occasion set contains no RS transmission occasion for the power-saving signal or no RS transmission occasion for the target PO, or determine that the target RS transmission occasion set contains at least the RS transmission occasion for the power-saving signal or the RS transmission occasion for the target PO, on condition that no power-saving signal is detected or transmitted by the first device on the target resource set.

In some implementations, the RS transmission occasion for the power-saving signal or the RS transmission occasion for the target PO is determined according to a first time offset.

In some implementations, the RS transmission occasion for the power-saving signal or the RS transmission occasion for the target PO includes part or all of RS transmission occasions in a first duration corresponding to the first time offset, where the first time offset is used for determining a start position of the first duration.

In some implementations, the first time offset is preconfigured, agreed by a protocol, or configured by a network device.

In some implementations, the RS transmission occasions in the target RS transmission occasion set are in a first correspondence with PDCCH monitoring occasions in a PDCCH monitoring occasion set in the target PO.

In some implementations, the number of the PDCCH monitoring occasions in the PDCCH monitoring occasion set in the target PO is equal to a product of a first parameter and the number of actually transmitted SSBs indicated by ssb-PositionsInBurst, where the first parameter indicates the number of PDCCH monitoring occasions per SSB.

In some implementations, in the first correspondence, the RS transmission occasions are in one-to-one correspondence with the PDCCH monitoring occasions, or the RS transmission occasions are in one-to-multiple correspondence with the PDCCH monitoring occasions, or the RS transmission occasions are in multiple-to-one correspondence with the PDCCH monitoring occasions, or the RS transmission occasions are quasi co-located with the PDCCH monitoring occasions.

In some implementations, the first correspondence is preconfigured, agreed by a protocol, or configured by a network device.

In some implementations, the RS transmission occasions in the target RS transmission occasion set are in a second correspondence with SSBs in an SSB set.

In some implementations, in the second correspondence, the RS transmission occasions are in one-to-one correspondence with the SSBs, or the RS transmission occasions are in one-to-multiple correspondence with the SSBs, or the RS transmission occasions are in multiple-to-one correspondence with the SSBs, or the RS transmission occasions are quasi co-located with the SSBs.

In some implementations, the SSBs in the SSB set are the actually transmitted SSBs indicated by ssb-PositionsIn-Burst.

In some implementations, the second correspondence is preconfigured, agreed by a protocol, or configured by a network device.

In some implementations, the RS transmission occasions in the target RS transmission occasion set are in a third correspondence with power-saving-signal monitoring occasions in a power-saving-signal monitoring occasion set corresponding to the target PO.

In some implementations, in the third correspondence, the RS transmission occasions are in one-to-one correspondence with the power-saving-signal monitoring occasions, or the RS transmission occasions are in one-to-multiple correspondence with the power-saving-signal monitoring occasions, or the RS transmission occasions are in multiple-to-one correspondence with the power-saving-signal monitoring occasions, or the RS transmission occasions are quasi co-located with the power-saving-signal monitoring occasions.

In some implementations, the power-saving-signal monitoring occasions in the power-saving-signal monitoring occasion set are located in the target resource set.

In some implementations, the third correspondence is preconfigured, agreed by a protocol, or configured by a network device.

In some implementations, RS resources in an RS resource set are in a fourth correspondence with SSBs in an SSB set, where each RS transmission occasion in the target RS transmission occasion set corresponds to one RS resource in the RS resource set.

In some implementations, in the fourth correspondence, the RS resources are in one-to-one correspondence with the SSBs, or the RS resources are in one-to-multiple correspondence with the SSBs, or the RS resources are in multiple-to-one correspondence with the SSBs, or the RS resources are quasi co-located with the SSBs.

In some implementations, the SSBs in the SSB set are the actually transmitted SSBs indicated by ssb-PositionsIn-Burst.

In some implementations, the fourth correspondence is preconfigured, agreed by a protocol, or configured by a network device.

In some implementations, the RS includes at least one of a TRS or a CSI-RS.

In some implementations, the power-saving signal is a PEI.

In some implementations, the first device is a terminal device. The processing unit 410 is specifically configured to determine the target RS transmission occasion set according to whether the power-saving signal is detected on the target resource set and/or according to the content indicated by the power-saving signal.

In some implementations, the first device is a network device. The processing unit 410 is specifically configured to determine the target RS transmission occasion set according to whether the power-saving signal is transmitted on the target resource set and/or according to the content indicated by the power-saving signal.

In some implementations, the processing unit may be one or more processors.

It can be understood that, according to implementations of the disclosure, the device 400 for wireless communication can correspond to the first device in the method implementations of the disclosure, and the above-mentioned and other operations and/or functions of each unit in the device 400 for wireless communication respectively implement a corresponding process performed by the first device in the method 200 as illustrated in FIG. 5, which will not be repeated herein for the sake of simplicity.

FIG. 16 illustrates a schematic block diagram of a device 500 for wireless communication according to implementations of the disclosure. The device 500 for wireless communication is a first device. The device 500 for wireless communication includes a processing unit 510. The processing unit 510 is configured to determine a target RS transmission occasion set. RS transmission occasions in the target RS transmission occasion set are in a first correspondence with PDCCH monitoring occasions in a PDCCH monitoring occasion set in a target PO, or the RS transmission occasions in the target RS transmission occasion set are in a second correspondence with SSBs in an SSB set, or the RS transmission occasions in the target RS transmission occasion set are in a third correspondence with power-saving-signal monitoring occasions in a power-saving-signal monitoring occasion set corresponding to the target PO, or RS resources in an RS resource set are in a fourth correspondence with the SSBs in the SSB set. Each RS transmission occasion in the target RS transmission occasion set corresponds to one RS resource in the RS resource set.

In some implementations, the processing unit 510 is specifically configured to determine the target RS transmission occasion set according to the PDCCH monitoring occasions in the target PO and the first correspondence, in the case where the RS transmission occasions in the target RS transmission occasion set are in the first correspondence with the PDCCH monitoring occasions in the PDCCH monitoring occasion set in the target PO.

In some implementations, the number of the PDCCH monitoring occasions in the PDCCH monitoring occasion set in the target PO is equal to a product of a first parameter and the number of actually transmitted SSBs indicated by ssb-PositionsInBurst, where the first parameter indicates the number of PDCCH monitoring occasions per SSB.

In some implementations, in the first correspondence, the RS transmission occasions are in one-to-one correspondence with the PDCCH monitoring occasions, or the RS transmission occasions are in one-to-multiple correspondence with the PDCCH monitoring occasions, or the RS transmission occasions are in multiple-to-one correspondence with the PDCCH monitoring occasions, or the RS transmission occasions are quasi co-located with the PDCCH monitoring occasions.

In some implementations, the first correspondence is preconfigured, agreed by a protocol, or configured by a network device.

In some implementations, the processing unit 510 is specifically configured to determine the target RS transmission occasion set according to the SSBs in the SSB set and the second correspondence, in the case where the RS transmission occasions in the target RS transmission occasion set are in the second correspondence with the SSBs in the SSB set.

In some implementations, in the second correspondence, the RS transmission occasions are in one-to-one correspondence with the SSBs, or the RS transmission occasions are in one-to-multiple correspondence with the SSBs, or the RS transmission occasions are in multiple-to-one correspondence with the SSBs, or the RS transmission occasions are quasi co-located with the SSBs.

In some implementations, the second correspondence is preconfigured, agreed by a protocol, or configured by a network device.

In some implementations, the processing unit 510 is specifically configured to determine the target RS transmission occasion set according to the power-saving-signal monitoring occasions in the power-saving-signal monitoring occasion set corresponding to the target PO and the third correspondence, in the case where the RS transmission occasions in the target RS transmission occasion set are in the third correspondence with the power-saving-signal monitoring occasions in the power-saving-signal monitoring occasion set corresponding to the target PO.

In some implementations, in the third correspondence, the RS transmission occasions are in one-to-one correspondence with the power-saving-signal monitoring occasions, or the RS transmission occasions are in one-to-multiple correspondence with the power-saving-signal monitoring occasions, or the RS transmission occasions are in multiple-to-one correspondence with the power-saving-signal monitoring occasions, or the RS transmission occasions are quasi co-located with the power-saving-signal monitoring occasions.

In some implementations, the third correspondence is preconfigured, agreed by a protocol, or configured by a network device.

In some implementations, the processing unit 510 is specifically configured to determine the RS resource set according to the SSBs in the SSB set and the fourth correspondence and determine the target RS transmission occasion set according to the RS resources in the RS resource set, in the case where the RS resources in the RS resource set are in the fourth correspondence with the SSBs in the SSB set.

In some implementations, in the fourth correspondence, the RS resources are in one-to-one correspondence with the SSBs, or the RS resources are in one-to-multiple correspondence with the SSBs, or the RS resources are in multiple-to-one correspondence with the SSBs, or the RS resources are quasi co-located with the SSBs.

In some implementations, the fourth correspondence is preconfigured, agreed by a protocol, or configured by a network device.

In some implementations, the SSBs in the SSB set are the actually transmitted SSBs indicated by ssb-PositionsInBurst.

In some implementations, the processing unit 510 is specifically configured to determine the target RS transmission occasion set according to a resource position of a channel carrying the power-saving signal or a resource position of a signal carrying the power-saving signal. The power-saving signal indicates whether a terminal device is to monitor in the target PO a PDCCH carrying paging indication information.

In some implementations, the target RS transmission occasion set contains N RS transmission occasions before the resource position of the channel carrying the power-saving signal or the resource position of the signal carrying the power-saving signal, and N is a positive integer.

In some implementations, N is preconfigured, agreed by a protocol, or configured by a network device.

In some implementations, the processing unit 510 is specifically configured to determine the target RS transmission occasion set according to a first time offset. The target RS transmission occasion set contains part or all of RS transmission occasions in a first duration corresponding to the first time offset, and the first time offset is used for determining a start position of the first duration.

In some implementations, the first time offset is preconfigured, agreed by a protocol, or configured by a network device.

In some implementations, the processing unit 510 is specifically configured to determine the target RS transmission occasion set according to a second time offset and the resource position of the channel carrying the power-saving signal or the resource position of the signal carrying the power-saving signal. The second time offset is an offset between a start position of the target PO and a start position of a first duration, and the target RS transmission occasion set is located in the first duration.

In some implementations, the second time offset is preconfigured, agreed by a protocol, or configured by a network device.

In some implementations, the RS includes at least one of a TRS or a CSI-RS.

In some implementations, the power-saving signal is a PEI.

In some implementations, the first device is a terminal device or a network device.

In some implementations, the processing unit may be one or more processors.

It can be understood that, according to implementations of the disclosure, the device 500 for wireless communication can correspond to the first device in the method implementations of the disclosure, and the above-mentioned and other operations and/or functions of each unit in the device 500 for wireless communication respectively implement a corresponding process performed by the first device in the method 300 as illustrated in FIG. 12, which will not be repeated herein for the sake of simplicity.

Figure 17:
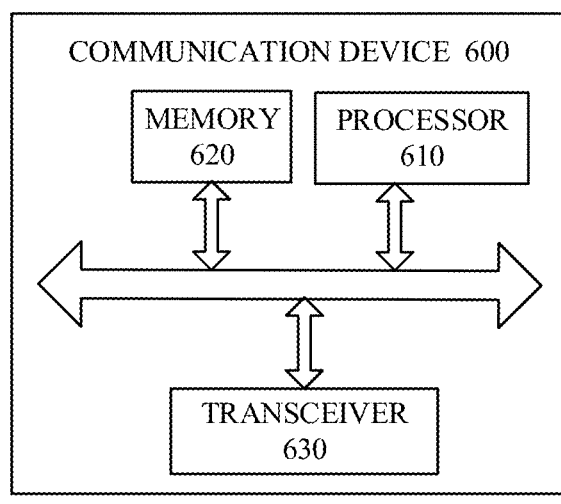
FIG. 17 is a schematic block diagram of a communication device according to implementations of the disclosure.

FIG. 17 is a schematic block diagram of a communication device 600 according to implementations of the disclosure. The communication device 600 illustrated in FIG. 17 includes a processor 610. The processor 610 is configured to invoke and execute computer programs stored in a memory, to implement the methods in implementations of the disclosure.

In some implementations, as illustrated in FIG. 17, the communication device 600 may further include a memory 620. The processor 610 is configured to invoke and execute computer programs stored in the memory 620, to implement the methods in implementations of the disclosure.

The memory 620 may be a separated device independent of the processor 610, or may be integrated into the processor 610.

In some implementations, as illustrated in FIG. 17, the communication device 600 may further include a transceiver 630. The processor 610 can control the transceiver 630 to communicate with other devices. Specifically, the transceiver 630 can transmit information or data to other devices, or receive information or data transmitted by other devices.

The transceiver 630 may include a transmitter and a receiver. The transceiver 630 may further include one or more antennas.

In some implementations, the communication device 600 may specifically be the network device in the implementations of the disclosure, and the communication device 600 can implement the corresponding process implemented by the network device in each of the methods of the implementations of the disclosure, which will not be repeated herein for the sake of simplicity.

In some implementations, the communication device 600 may specifically be the terminal device in the implementations of the disclosure, and the communication device 600 can implement the corresponding process implemented by the terminal device in each of the methods of the implementations of the disclosure, which will not be repeated herein for the sake of simplicity.

Figure 18:
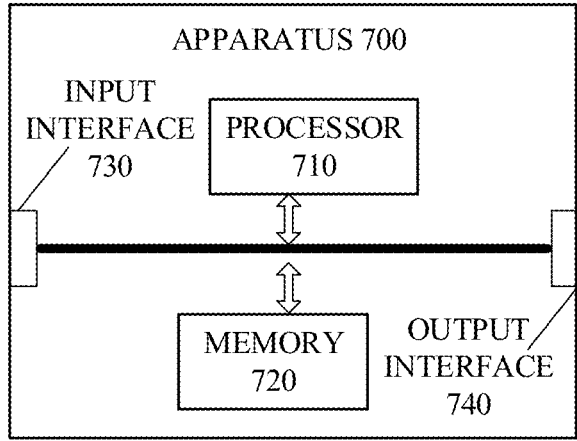
FIG. 18 is a schematic block diagram of an apparatus according to implementations of the disclosure.

FIG. 18 is a schematic block diagram of an apparatus 700 according to implementations of the disclosure. The apparatus 700 illustrated in FIG. 18 includes a processor 710. The processor 710 is configured to invoke and execute computer programs stored in a memory, to implement the methods in implementations of the disclosure.

In some implementations, as illustrated in FIG. 18, the apparatus 700 may further include a memory 720. The processor 710 is configured to invoke and execute computer programs stored in the memory 720, to implement the methods in implementations of the disclosure.

The memory 720 may be a separated device independent of the processor 710, or may be integrated into the processor 710.

In some implementations, the apparatus 700 may further include an input interface 730. The processor 710 can control the input interface 730 to communicate with other devices or chips. Specifically, the input interface 730 can obtain information or data transmitted by other devices or chips.

In some implementations, the apparatus 700 may further include an output interface 740. The processor 710 can control the output interface 740 to communicate with other devices or chips. Specifically, the output interface 740 can output information or data to other devices or chips.

In some implementations, the apparatus may be applied to the network device in the implementations of the disclosure, and the apparatus can implement the corresponding process implemented by the network device in each of the methods in the implementations of the disclosure, which will not be repeated herein for the sake of simplicity.

In some implementations, the apparatus may be applied to the terminal device in the implementations of the disclosure, and the apparatus can implement the corresponding process implemented by the terminal device in each of the methods in the implementations of the disclosure, which will not be repeated herein for the sake of simplicity.

In some implementations, the apparatus mentioned in the implementations of the disclosure may also be referred to as chip, such as a system-level chip, a system chip, a chip system, a system-on-a-chip chip, or the like.

Figure 19:
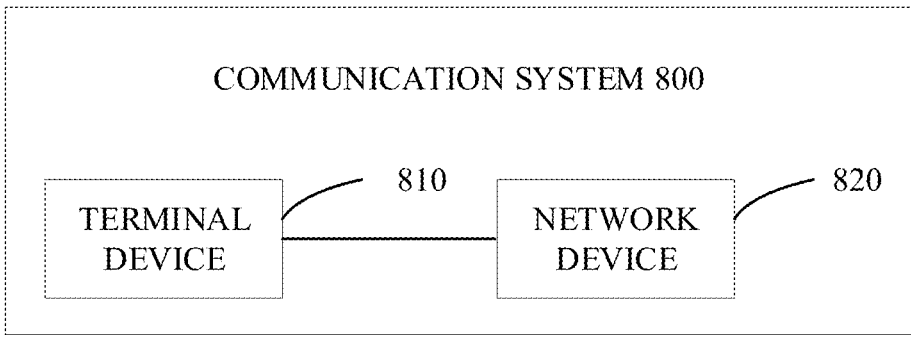
FIG. 19 is a schematic block diagram of a communication system according to implementations of the disclosure.

FIG. 19 is a schematic block diagram of a communication system 800 according to implementations of the disclosure. As illustrated in FIG. 19, the communication system 800 includes a terminal device 810 and a network device 820.

The terminal device 810 can be configured to implement the functions performed by the terminal device in the foregoing method, and the network device 820 can be configured to implement the functions performed by the network device in the foregoing method, which will not be repeated herein for the sake of simplicity.

It can be understood that, the processor referred to herein may be an integrated circuit chip with signal processing capabilities. During implementation, each step of the fore-going method may be completed by an integrated logic circuit of hardware in the processor or an instruction in the form of software. The processor may be a general-purpose processor, a digital signal processor (DSP), an application specific integrated circuit (ASIC), a field programmable gate array (FPGA), or other programmable logic devices, discrete gates or transistor logic devices, discrete hardware components. The methods, steps, and logic blocks disclosed in implementations can be implemented or executed. The general purpose processor may be a microprocessor, or the processor may be any conventional processor or the like. The steps of the method disclosed in implementations may be directly implemented as a hardware decoding processor, or may be performed by hardware and software modules in the decoding processor. The software module can be located in a storage medium such as a random access memory (RAM), a flash memory, a read only memory (ROM), a programmable ROM (PROM), or an electrically erasable programmable memory, registers, and the like. The storage medium is located in the memory. The processor reads the information in the memory, and completes the steps of the above-mentioned method with the hardware thereof.

It can be understood that, the memory may be a volatile memory or a non-volatile memory, or may include both the volatile memory and the non-volatile memory. The non-volatile memory may be an ROM, a PROM, an erasable PROM (EPROM), an electrically EPROM (EEPROM), or a flash memory. The volatile memory can be an RAM that acts as an external cache. By way of example but not limitation, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SL-DRAM), and a direct rambus RAM (DR RAM). The memory of the system and the method described herein is intended to include, but is not limited to, these and any other suitable types of memory.

It is to be understood that, the above description of the memory is intended for illustration rather than limitation. For example, the memory of implementations may also be an SRAM, a DRAM, an SDRAM, a DDR SDRAM, an ESDRAM, an SLDRAM, a DR RAM, and so on. In other words, the memory of implementations is intended to include, but is not limited to, these and any other suitable types of memory.

A computer-readable storage medium is further provided in implementations of the disclosure. The computer-readable storage medium is configured to store computer programs.

In some implementations, the computer-readable storage medium may be applicable to the network device of implementations of the disclosure. The computer programs enable a computer to perform the operations performed by the network device in the foregoing methods in implementations of the disclosure, which will not be repeated herein for the sake of simplicity.

In some implementations, the computer-readable storage medium may be applicable to the terminal device of implementations of the disclosure. The computer programs enable a computer to perform the operations performed by the terminal device in the foregoing methods in implementations of the disclosure, which will not be repeated herein for the sake of simplicity.

A computer program product is further provided in implementations of the disclosure. The computer program product includes computer program instructions.

In some implementations, the computer program product may be applicable to the network device of implementations of the disclosure. The computer program instructions enable a computer to perform the operations performed by the network device in the foregoing methods in implementations of the disclosure, which will not be repeated herein for the sake of simplicity.

In some implementations, the computer program product may be applicable to the terminal device of implementations of the disclosure. The computer program instructions enable a computer to perform the operations performed by the terminal device in the foregoing methods in implementations of the disclosure, which will not be repeated herein for the sake of simplicity.

A computer program is further provided in implementations of the disclosure.

In some implementations, the computer program may be applicable to the network device of implementations of the disclosure. The computer program when running on a computer, enable the computer to perform the operations performed by the network device in the foregoing methods in implementations of the disclosure, which will not be repeated herein for the sake of simplicity.

In some implementations, the computer program may be applicable to the terminal device of implementations of the disclosure. The computer program when running on a computer, enable the computer to perform the operations performed by the terminal device in the foregoing methods in implementations of the disclosure, which will not be repeated herein for the sake of simplicity.

Those of ordinary skill in the art will appreciate that units and algorithmic operations of various examples described in connection with implementations herein can be implemented by electronic hardware or by a combination of computer software and electronic hardware. Whether these functions are performed by means of hardware or software depends on the application and the design constraints of the associated technical solution. Those skilled in the art may use different methods with regard to each particular application to implement the described functionality, but such methods should not be regarded as lying beyond the scope of the disclosure.

It will be evident to those skilled in the art that, for the sake of convenience and simplicity, in terms of the working processes of the foregoing systems, apparatuses, and units, reference can be made to the corresponding processes of the above method implementations, which will not be repeated herein.

It will be appreciated that the systems, apparatuses, and methods disclosed in implementations herein may also be implemented in various other manners. For example, the above apparatus implementations are merely illustrative, e.g., the division of units is only a division of logical functions, and there may exist other manners of division in practice, e.g., multiple units or assemblies may be combined or may be integrated into another system, or some features may be ignored or skipped. In other respects, the coupling or direct coupling or communication connection as illustrated or discussed may be an indirect coupling or communication connection through some interface, device or unit, and may be electrical, mechanical, or otherwise.

Separated units as illustrated may or may not be physically separated. Components or parts displayed as units may or may not be physical units, and may reside at one location or may be distributed to multiple networked units. Some or all of the units may be selectively adopted according to practical needs to achieve desired objectives of the disclosure.

In addition, various functional units described in implementations of the disclosure may be integrated into one processing unit or may be present as a number of physically separated units, and two or more units may be integrated into one.

If the functions are implemented as software functional units and sold or used as standalone products, they may be stored in a computer readable storage medium. Based on such an understanding, the essential technical solution, or the portion that contributes to the prior art, or part of the technical solutions of the disclosure may be embodied as software products. The computer software products can be stored in a storage medium and may include multiple instructions that, when executed, can cause a computing device, e.g., a personal computer, a server, a network device, etc., or a processor to execute some or all operations of the methods described in various implementations. The above storage medium may include various kinds of media that can store program codes, such as a universal serial bus (USB) flash disk, a mobile hard drive, an ROM, an RAM, a magnetic disk, or an optical disk.

The above are merely specific implementations of the disclosure and are not intended to limit the scope of protection of the disclosure. Any modification and replacement made by those skilled in the art within the technical scope of the disclosure shall be included in the scope of protection of the disclosure. Therefore, the scope of protection of the disclosure should be stated in the scope of protection of the claims.

What is claimed is:

1. A method for wireless communication, comprising:
determining, by a first device, a target reference signal (RS) transmission occasion set at least according to content indicated by a power-saving signal;
wherein the power-saving signal indicates whether a terminal device is to monitor in a target paging occasion (PO) a physical downlink control channel (PDCCH) carrying paging indication information, and the target RS transmission occasion set contains RS transmission occasions for transmitting an RS.

2. The method of claim 1, wherein determining, by the first device, the target RS transmission occasion set at least according to the content indicated by the power-saving signal comprises determining, by the first device, the target RS transmission occasion set according to whether the power-saving signal is detected or transmitted on a target resource set and according to the content indicated by the power-saving signal;
wherein determining, by the first device, the target RS transmission occasion set according to whether the power-saving signal is detected or transmitted on the target resource set and according to the content indicated by the power-saving signal comprises the following:
on condition that the power-saving signal is detected or transmitted by the first device on the target resource set, and the power-saving signal indicates that a terminal device group or a terminal device sub-group where the terminal device is located is to monitor in the target PO the PDCCH carrying the paging indication information, determining, by the first device, that the target RS transmission occasion set contains at least an RS transmission occasion for the power-saving signal or an RS transmission occasion for the target PO; and
on condition that the power-saving signal is detected or transmitted by the first device on the target resource set, and the power-saving signal indicates that the terminal device group or the terminal device sub-group where the terminal device is located is not to monitor in the target PO the PDCCH carrying the paging indication information, determining, by the first device, that the target RS transmission occasion set contains no RS transmission occasion for the power-saving signal or no RS transmission occasion for the target PO.

3. The method of claim 2, wherein the RS transmission occasion for the power-saving signal or the RS transmission occasion for the target PO is determined according to a first time offset.

4. The method of claim 3, wherein the RS transmission occasion for the power-saving signal or the RS transmission occasion for the target PO comprises part or all of RS transmission occasions in a first duration corresponding to the first time offset, wherein the first time offset is used for determining a start position of the first duration.

5. The method of claim 1, wherein the RS transmission occasions in the target RS transmission occasion set are in a first correspondence with PDCCH monitoring occasions in a PDCCH monitoring occasion set in the target PO.

6. The method of claim 5, wherein number of the PDCCH monitoring occasions in the PDCCH monitoring occasion set in the target PO is equal to a product of a first parameter and number of actually transmitted synchronization signal blocks (SSBs) indicated by SSB positions in burst (ssb-PositionsInBurst), wherein the first parameter indicates number of PDCCH monitoring occasions per SSB.

7. The method of claim 5, wherein in the first correspondence, the RS transmission occasions are in one-to-one correspondence with the PDCCH monitoring occasions, or the RS transmission occasions are in one-to-multiple correspondence with the PDCCH monitoring occasions, or the RS transmission occasions are in multiple-to-one correspondence with the PDCCH monitoring occasions, or the RS transmission occasions are quasi co-located with the PDCCH monitoring occasions.

8. The method of claim 1, wherein the RS transmission occasions in the target RS transmission occasion set are in a second correspondence with SSBs in an SSB set.

9. The method of claim 8, wherein in the second correspondence, the RS transmission occasions are in one-to-one correspondence with the SSBs, or the RS transmission occasions are in one-to-multiple correspondence with the SSBs, or the RS transmission occasions are in multiple-to-one correspondence with the SSBs, or the RS transmission occasions are quasi co-located with the SSBs, wherein the SSBs in the SSB set are actually transmitted SSBs indicated by ssb-PositionsInBurst.

10. The method of claim 1, wherein the RS transmission occasions in the target RS transmission occasion set are in a third correspondence with power-saving-signal monitoring occasions in a power-saving-signal monitoring occasion set corresponding to the target PO.

11. The method of claim 10, wherein in the third correspondence, the RS transmission occasions are in one-to-one correspondence with the power-saving-signal monitoring occasions, or the RS transmission occasions are in one-to-multiple correspondence with the power-saving-signal monitoring occasions, or the RS transmission occasions are in multiple-to-one correspondence with the power-saving-signal monitoring occasions, or the RS transmission occasions are quasi co-located with the power-saving-signal monitoring occasions, wherein the power-saving-signal monitoring occasions in the power-saving-signal monitoring occasion set are located in the target resource set.

12. The method of claim 1, wherein RS resources in an RS resource set are in a fourth correspondence with SSBs in an SSB set, wherein each RS transmission occasion in the target RS transmission occasion set corresponds to one RS resource in the RS resource set.

13. The method of claim 12, wherein in the fourth correspondence, the RS resources are in one-to-one correspondence with the SSBs, or the RS resources are in one-to-multiple correspondence with the SSBs, or the RS resources are in multiple-to-one correspondence with the SSBs, or the RS resources are quasi co-located with the SSBs, wherein the SSBs in the SSB set are actually transmitted SSBs indicated by ssb-PositionsInBurst.

14. The method of claim 1, wherein the power-saving signal is a paging early indication (PEI).

15. The method of claim 2, wherein the first device is a terminal device; and determining, by the first device, the target RS transmission occasion set according to whether the power-saving signal is detected or transmitted on the target resource set and according to the content indicated by the power-saving signal comprises:

determining, by the first device, the target RS transmission occasion set according to whether the power-saving signal is detected on the target resource set and/or according to the content indicated by the power-saving signal.

16. The method of claim 2, wherein the first device is a network device; and determining, by the first device, the target RS transmission occasion set according to whether the power-saving signal is detected or transmitted on the target resource set and according to the content indicated by the power-saving signal comprises:

determining, by the first device, the target RS transmission occasion set according to whether the power-saving signal is transmitted on the target resource set and according to the content indicated by the power-saving signal.

17. A first device comprising:

a transceiver;

a processor coupled to the transceiver; and a memory configured to store a computer program;

wherein the processor is configured to execute the computer program to cause the first device to:

determine a target reference signal (RS) transmission occasion set at least according to content indicated by a power-saving signal;

wherein the power-saving signal indicates whether a terminal device is to monitor in a target paging occasion (PO) a physical downlink control channel (PDCCH) carrying paging indication information, and the target RS transmission occasion set comprises RS transmission occasions for transmitting an RS.

18. The first device of claim 17, wherein the processor configured to execute the computer program to determine the target RS transmission occasion set at least according to the content indicated by the power-saving signal is configured to execute the computer program to determine the target RS transmission occasion set according to whether the power-saving signal is detected or transmitted on a target resource set and according to the content indicated by the power-saving signal;

wherein the processor configured to execute the computer program to determine the target RS transmission occasion set according to whether the power-saving signal is detected or transmitted on the target resource set and according to the content indicated by the power-saving signal is configured to execute the computer program to cause the first device to perform the following:

on condition that the power-saving signal is detected or transmitted by the first device on the target resource set, and the power-saving signal indicates that a terminal device group or a terminal device sub-group where the terminal device is located is to monitor in the target PO the PDCCH carrying the paging indication information, determining that the target RS transmission occasion set contains at least an RS transmission occasion for the power-saving signal or an RS transmission occasion for the target PO; and on condition that the power-saving signal is detected or transmitted by the first device on the target resource set, and the power-saving signal indicates that the terminal device group or the terminal device sub-group where the terminal device is located is not to monitor in the target PO the PDCCH carrying the paging indication information, determining that the target RS transmission occasion set contains no RS transmission occasion for the power-saving signal or no RS transmission occasion for the target PO.

19. The first device of claim 18, wherein the RS transmission occasion for the power-saving signal or the RS transmission occasion for the target PO is determined according to a first time offset.

20. The first device of claim 19, wherein the RS transmission occasion for the power-saving signal or the RS transmission occasion for the target PO comprises part or all of RS transmission occasions in a first duration corresponding to the first time offset, wherein the first time offset is used for determining a start position of the first duration.

* * * * *